United States Patent
Yokouchi et al.

(10) Patent No.: US 8,284,444 B2
(45) Date of Patent: *Oct. 9, 2012

(54) APPARATUS AND METHOD THAT REDUCES STREAKING BY USING A DEFORMED DATA PORTION TO NOT ARRAY DOTS CONTINUOUSLY IN THE MAIN SCAN DIRECTION OF THE PRINT HEAD IN THE END PORTIONS OF THE SUB-SCAN DIRECTION

(75) Inventors: Shingo Yokouchi, Suwa-gun (JP); Katsumi Nashimoto, Suwa-gun (JP)

(73) Assignee: Mutoh Industries Ltd., Tokyo (JP)

( * ) Notice: Subject to any disclaimer, the term of this patent is extended or adjusted under 35 U.S.C. 154(b) by 1063 days.

This patent is subject to a terminal disclaimer.

(21) Appl. No.: 12/224,998

(22) PCT Filed: Feb. 14, 2007

(86) PCT No.: PCT/JP2007/000085
§ 371 (c)(1),
(2), (4) Date: Sep. 11, 2008

(87) PCT Pub. No.: WO2007/116577
PCT Pub. Date: Oct. 18, 2007

(65) Prior Publication Data
US 2009/0091785 A1    Apr. 9, 2009

(30) Foreign Application Priority Data

Mar. 31, 2006 (JP) ................... 2006-096307
Jul. 26, 2006 (JP) ................... 2006-202699
Jul. 26, 2006 (JP) ................... 2006-202700
Jul. 26, 2006 (JP) ................... 2006-202701

(51) Int. Cl.
*H04N 1/409* (2006.01)
*G06K 15/10* (2006.01)
*B41J 2/01* (2006.01)
(52) U.S. Cl. .............. 358/1.8; 358/3.26; 347/10; 347/12
(58) Field of Classification Search .................. 358/1.8, 358/1.9, 3.26, 502, 443, 448, 463, 296; 347/9–15
See application file for complete search history.

(56) References Cited

U.S. PATENT DOCUMENTS 5,384,587 A    1/1995    Takagi et al.
(Continued)

FOREIGN PATENT DOCUMENTS

JP    2891799    5/1999
(Continued)

*Primary Examiner* — Scott A Rogers
(74) *Attorney, Agent, or Firm* — Wenderoth, Lind & Ponack, L.L.P.

(57) ABSTRACT

Print data composed of a multiplicity of dot information is supplied to a printing head having a plurality of dot forming elements arrayed along a sub-scanning direction. The printing head and the printing medium relatively move in main scanning direction and sub-scanning direction each other, and an image is printed on the surface of the printing medium. In the print data supplied by every main scanning action of the printing head, a deformed data portion of concave and convex shapes of waveform are formed, for example, so that dots may not be arrayed parallel continuously in the main scanning direction of the printing head, at the joint of the ends of the sub-scanning direction. The concave and convex shapes at the joint side of the print data, and the concave and convex shapes at the joint side of other print data adjacent to the print data are printed in mutually fitted state.

47 Claims, 31 Drawing Sheets

U.S. PATENT DOCUMENTS

| | | | |
|---|---|---|---|
| 6,491,373 B1 * | 12/2002 | Fujita et al. | 347/15 |
| 6,601,939 B2 * | 8/2003 | Fujita et al. | 347/15 |
| 6,963,423 B2 * | 11/2005 | Ogasahara et al. | 358/1.8 |
| 7,070,346 B2 * | 7/2006 | Fujimori | 347/14 |
| 7,198,347 B2 * | 4/2007 | Tayuki | 347/15 |
| 7,252,356 B2 * | 8/2007 | Ide et al. | 347/12 |
| 2006/0044334 A1 * | 3/2006 | Fujita et al. | 347/12 |
| 2008/0284805 A1 * | 11/2008 | Kiuchi et al. | 347/9 |
| 2011/0227982 A1 * | 9/2011 | Marumoto et al. | 347/14 |

FOREIGN PATENT DOCUMENTS

JP   2940362   8/1999

* cited by examiner

Second printing

Fifth printing

Eighth printing

Print data deformation example

How to make additional print data (A)

(B)

Sixth printing (end of data)

Seventh printing

Eighth printing

Ninth printing (end of printing)

Other basic mask pattern

Exampe of mask pattern (A)

(B)

To change in concentration (printing rate)
(head scanning direction)

How to make additional print data (A)

Basic mask pattern

Making of a plurality of mask pattern data by devating the phase of basic mask pattern (B)

a Basic type

Developed type from part b

Developed type from part c

Developed type from part d

Example of print result using patterns of a and c

APPARATUS AND METHOD THAT REDUCES STREAKING BY USING A DEFORMED DATA PORTION TO NOT ARRAY DOTS CONTINUOUSLY IN THE MAIN SCAN DIRECTION OF THE PRINT HEAD IN THE END PORTIONS OF THE SUB-SCAN DIRECTION

BACKGROUND OF THE INVENTION

I. Technical Field

The present invention relates to a printing apparatus and a printing method of a system of moving a head in a scanning system in an ink jet printer for printing an image on the surface of a printing medium by supplying print data composed of a multiplicity of dot information to a printing head having a plurality of dot forming elements arrayed in a sub-scanning direction, and moving the printing head and a printing medium relatively in a main scanning direction and a sub-scanning direction.

II. Description of the Related Art

To make printing unevenness at joint portions less obvious in a printing apparatus, it has been proposed to complicate the printing positions (refer to, for example, Japanese Unexamined Patent Application Publication No. 2003-34017). Or to reduce concentration unevenness of black streak or the like, it is proposed to control the quantity of ink (refer to, for example, Japanese Unexamined Patent Application Publication No. 2002-200745). Other ink jet recording apparatus is proposed for suppressing decline of image quality due to joining streaks in the boundary of a band and other band by a process of decimating dots or printing in duplicate (refer to, for example, Japanese Unexamined Patent Application Publication No. 2000-238935). Further, to make joints less obvious, a recording method is proposed to duplicate lines, and to record the recording density of the duplicate lines at a lower density than other non-duplicate lines (refer to, for example, Japanese Unexamined Patent Application Publication No. H09-99550). Other printer is known to prevent banding by printing obliquely (refer to, for example, Japanese Unexamined Patent Application Publication No. 2000-52595).

SUMMARY OF THE INVENTION

Streak-like phenomenon in the scanning direction of the head seems to be caused by complicated factors including transfer precision of paper of the printing apparatus, mechanical error, deviation of mounting position of the head, deviation of printing position of the ink discharged from the head, and problems of print data. However, considering that the streaks appear in the scanning direction of the head, a major factor seems to be related to the operation of the printing head which moves in the scanning direction of the head after the paper is delivered and prints for a certain printing width. Or, depending on the printing head, when the ink discharge nozzle discharges the ink continuously, if multiple nozzles are discharging in parallel among multiple nozzles and printing nozzles, the precision of the printing position of the nozzles positioned at ends may not be satisfactory, and when deviations are linked in the lateral direction, streaks may be caused.

It is hence an object of the present invention to make streaks in the scanning direction of the head less obvious by preventing the streak-like phenomenon in the scanning direction of the head in parallel in the scanning direction in the joint portion even if the printing head is moved in the scanning direction.

To achieve the object, the present invention provides a printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, in which a deformed data portion is formed so that dots may not be arrayed continuously in the main scanning direction of the printing head in the end portions of the sub-scanning direction of the print data supplied in every main scanning operation of the printing head.

In present invention, the dot array in the deformed data portion has a shape of a waveform.

In present invention, printing of the image is completed sequentially in a unit of N times (N being an integer) of scanning of the printing head on the printing medium, and the print data of the image having the deformed data portion is supplied to the printing head.

In present invention, the deformed data portion is formed at the rear end portion of the sub-scanning direction of the print data including the ends of image among the print data supplied in every scanning on the printing head, the deformed data portion is formed at the front end portion and rear end portion of the sub-scanning direction of the print data of the intermediate portion of the image, and the deformed data portion is formed at the front end portion of the sub-scanning direction of the print data including the rear end of the image.

In present invention, when printing of the image including the deformed data portion is completed, a deletion portion of the image of the deformed data portion is complemented by the deformed data portion of the print data supplied to the printing head in next scanning of the printing head.

The present invention provides a printing method for printing on a printing medium by moving the printing head sequentially in a main scanning direction and delivering the printing medium in a sub-scanning direction in a print unit of print data of n (n being an integer) lines, in which end portion lines at the joint side repeat concave and convex shapes so that a specified number of lines at the joint side of the print data may not be arrayed continuously in the main scanning direction.

In present invention, the concave and convex shapes of the joint side of the print data, and the concave and convex shapes of the joint side of next print data adjacent to the print data are printed in mutually fitted state.

In present invention, the concave and convex shapes are waveforms.

In present invention, the concave and convex shapes formed by deleting the dot information at the joint side of print data by a mask pattern, and the deleted dot information is complemented by the concave and convex shapes of the print data printed by next scanning.

In present invention, the complement data of the deleted dot information may be created by inverting the mask pattern.

The present invention also provides a printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, in which a deformed data portion having concave and convex parts is formed so that dots may not be arrayed continuously in the main scanning direction of the printing head in the end portions, at the end side of the sub-scanning direction of main data portion of the print data supplied in every main scanning operation of the printing head, and the printing rate of the deformed data portion is changed.

In present invention, the printing rate of the deformed data portion is changed in the sub-scanning direction.

In present invention, the printing rate at the joint side of the print data is changed in the sub-scanning direction.

In present invention, a region changed in the printing rate at the joint side of the print data is formed as a deformed data portion, complementary data is created for complementing the dot data deleted and decimated from the deformed data portion, and the complementary data is overlapped and printed on the deformed data portion.

The present invention also provides a printing apparatus for supplying print data composed of a multiplicity of dot information on a printing head having a plurality of dot forming elements arrayed along a sub-scanning direction, moving the printing head and a printing medium relatively in a main scanning direction and a sub-scanning direction, and printing an image on the surface of the printing medium, in which a deformed data portion having concave and convex parts is formed so that dots may not be arrayed continuously in the main scanning direction of the printing head in the end portions of the sub-scanning direction of main data portion of the print data supplied in every main scanning operation of the printing head, and the deformed data portion is changed in the printing rate in the main scanning direction.

In present invention, the deformed data portion is changed in the printing rate in both main scanning direction and sub-scanning direction.

In present invention, the dot sequence of concave and convex parts of the deformed data portion is shaped like a waveform.

In present invention, a region of 100% printing rate is provided in the deformed data portion at the side contacting with the main data portion, and the region of 100% printing rate and a region changed in the printing rate of the deformed data portion contact with each other in concave and convex profile.

In present invention, the concave and convex profile is a waveform.

The present invention provides a printing method for printing on a printing medium by moving the printing head sequentially in a main scanning direction and delivering the printing medium in a sub-scanning direction in a print unit of print data of n (n being an integer) lines, in which the printing rate in a specified range near the joint side is changed in the main scanning direction so that a specified number of lines at the joint side of the print data may not be arrayed continuously in the main scanning direction, and that the joint side end portion lines may repeat concave and convex shapes.

In present invention, the printing rate in a specified range near the joint side is changed along both the main scanning direction and the sub-scanning direction.

In present invention, a region changed in the printing rate in the main scanning direction at the joint side of the print data is formed as a deformed data portion, complementary data is created for complementing the dot data deleted and decimated from the deformed data portion, and the complementary data is overlapped and printed on the deformed data portion.

In present invention, complementary data for complementing the dot data deleted and decimated from the deformed data portion is provided at the joint side of other print data contacting with the joint of the print data having the deformed data portion, and the complementary data is overlapped and printed on the deformed data portion.

In present invention, the concave and convex shapes of the deformed data portion are formed like a waveform.

The present invention also provides a printing apparatus for moving a printing head and a printing medium relatively in a main scanning direction and a sub-scanning direction, supplying print data composed of a multiplicity of dot information on a plurality of the printing heads arrayed in parallel so as to overlap in the main scanning direction, having a plurality of dot forming elements arrayed along a sub-scanning direction, and printing an image on the surface of the printing medium, further including deformed data generating means for generating a deformed data portion in the print data by forming concave and convex parts so that end portion dots of the print data may not be arrayed continuously in the main scanning direction of the printing heads in the end portion data of sub-scanning direction of the print data supplied to each printing head, in which the deformed data generating means generates deformed data portions deviated in phase, and print data having deformed data portion deviated in phase are supplied to the plurality of printing heads, and the deformed data portions deviated in phase by the plurality of printing heads are overlapped and printed.

The present invention also provides a printing apparatus for moving a printing head and a printing medium relatively in a main scanning direction and a sub-scanning direction, supplying print data composed of a multiplicity of dot information on the printing heads having a plurality of dot forming elements arrayed along a sub-scanning direction, and printing an image on the surface of the printing medium, further including a plurality of printing heads arrayed in parallel so as to overlap in the main scanning direction, deformed data generating means for generating a deformed data portion having concave and convex parts so that dots may not be arrayed continuously in the main scanning direction of the printing heads in the end portion data of sub-scanning direction of the print data supplied to the printing heads, and means for supplying print data having deformed data portions deviated in phase of concave and convex parts to the plurality of printing heads, and overlapping and printing the deformed data portions deviated in phase of concave and convex parts by the plurality of printing heads.

In present invention, the dot sequence of concave and convex parts of the deformed data portion is shaped like a waveform.

In present invention, a region changed in printing rate having the concave and convex parts is provided in the deformed data portion, a region of 100% printing rate is provided in the print data contacting with a main data portion, and the region of 100% printing rate and a region changed in the printing rate of the deformed data portion contact with each other in concave and convex profile.

In present invention, the concave and convex profile is a waveform.

In present invention, complementary data is created for complementing the deleted dot data of the deformed data portion, and the deleted dot data of the deformed data portion is complemented by the complementary data.

In present invention, the image is printed sequentially and completely in a unit of scanning of N times (N being an integer) on the printing medium by the printing head, and the printing head is provided with print data of the image having the deformed data portion, and the print data having the complementary data and/or the print data having both the deformed data portion and the complementary data.

In present invention, the deformed data portion is formed at the rear end portion of the sub-scanning direction of the print data including the ends of image among the print data supplied in every scanning on the printing head, the deformed data portion is formed at the rear end portion of the sub-scanning direction of the print data including the leading end of the image, the deformed data portion is formed in the rear end portion of the sub-scanning direction of the print data in the intermediate portion of the image, complementary data for complementing the deformed data portion of the adjacent print data is formed at the front end portion, and complementary data for complementing the deformed data portion of the joining print data is formed at the front end portion of the sub-scanning direction of the print data including the rear end of the image.

In present invention, when printing of the image including the deformed data portion is completed, a deletion portion of the image of the deformed data portion is complemented by the complementary data added to the end portion of the print data supplied to the printing head in next scanning of the printing head.

The present invention provides a printing method for printing on a printing medium by supplying n lines of (n being an integer) print data as a print unit sequentially to a plurality of printing heads arrayed in parallel so as to overlap in main scanning direction, and moving the printing head in a main scanning direction and delivering the printing medium in a sub-scanning direction, in which a deformed data portion is created in the print data by forming concave and convex parts so that end portion dots of the print data may not be arrayed continuously in the main scanning direction of the printing head to the end portion data of sub-scanning direction of the print data supplied to each printing head, and the deformed data portions deviated in phase by the plurality of printing heads overlapped and printed to the plurality of printing heads by supplying the print data having deformed data portions deviated in phase.

The present invention provides a printing method for printing on a printing medium by supplying n lines of (n being an integer) print data as a print unit sequentially to a plurality of printing heads arrayed in parallel so as to overlap in main scanning direction, and moving the printing head in a main scanning direction and delivering the printing medium in a sub-scanning direction, in which a plurality of mask pattern data are created by deviating the phase of a basic mask pattern, a deformed data portion is formed by forming concave and convex parts so that dots may not be arrayed continuously in main scanning direction in the end portion of sub-scanning direction of main data portion of the print data supplied to each printing head by the mask pattern data, the deformed data portions deviated in phase are supplied to the plurality of the printing heads, and the deformed data portions deviated in phase by the plurality of printing heads are overlapped and printed.

In present invention, complementary data for complementing the deleted dot data of the deformed data portion is created, and the complementary data is overlapped and printed in the deformed data portion.

In present invention, complementary data for complementing the deleted dot data of the deformed data portion is provided at the joint side of other print data joining to the joint of the print data having the deformed data portion, and complementary data is overlapped and printed to the deformed data portion.

In the present invention, the concave and convex shapes of the deformed data portion are shaped in a waveform.

The present invention provides a printing apparatus of a system for moving a printing head in a scanning direction, in which stream-like phenomenon appearing in the head scanning direction is easily made less obvious in the print result only by changing the data.

DETAILED DESCRIPTION OF THE INVENTION

The present invention is specifically described below while referring to the accompanying drawings.

Figure 1:
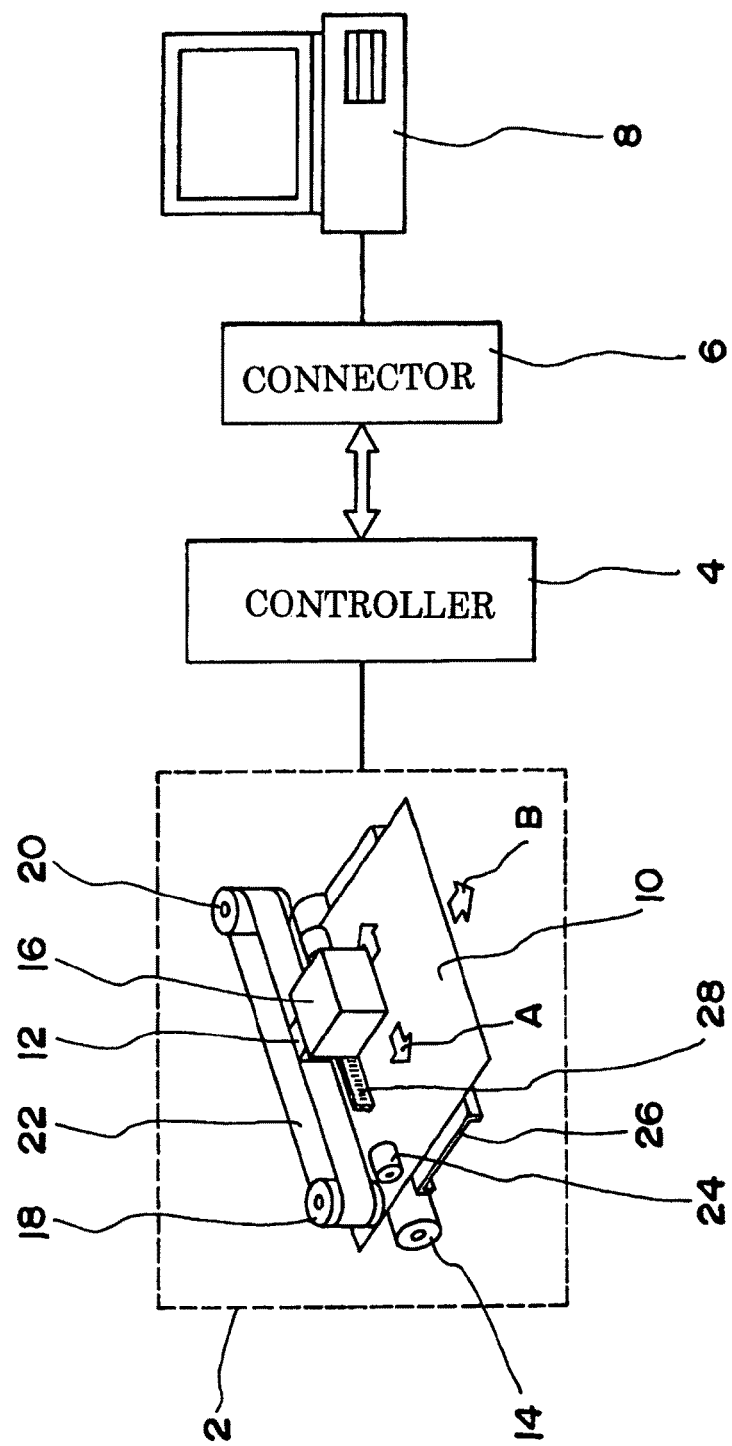
FIG. 1 is an overall outline block diagram of a printing apparatus.

FIG. 1 shows an overall outline view of a printing apparatus of the present invention. An ink jet printer 2 is controlled by a controller 4 including a computer circuit, and the controller 4 is connected to an external computer 8 by way of a connector 6. The controller 4 stores a program for converting the front and rear end portions of conveying direction of print data. The computer 8 transmits print data to the controller 4 mounted on the printer 2. The controller 4 analyzes the received data as described below, and controls the drive unit of the printer 2. The printer 2 includes a sub-scanning feed mechanism for conveying roll paper or other printing medium 10 in the direction of arrow B, and a main scanning feed mechanism for moving a carriage 12 reciprocally in the axial direction of a drive roller 14 by means of a carriage motor.

The feed direction B of the printing medium 10 by the sub-scanning feed mechanism is called a sub-scanning direction, and the moving direction A of the carriage 12 by the main scanning feed mechanism is called a main scanning direction. The term "printing" is not limited to writing of a character, but is used in a wide sense of meaning including printing of images and symbols. The carriage 12 is provided with a printing unit 16 having a plurality of printing heads. The carriage 12 is driven reciprocally in the main scanning direction A along the Y-axis rail (not shown) by a head driving belt 22 applied between belt driving rollers 18, 20. The printing medium 10 is driven in the sub-scanning direction by means of the drive roller 14 and a pinch roller 24, and slides on a platen 26. The printing medium 10 is ordinary roll paper. The position of the carriage 12 is detected by a timing defense signal from a linear encoder composed of sensor provided in the printing unit 16 and a linear scale 28 provided oppositely thereto.

In this configuration, when the printing action starts, by the control by the controller 4, the carriage 12 is driven reciprocally in the main scanning direction along the Y-axis rail, and ink drops are discharged from the nozzles of the printing head mounted on the printing unit 16. When the printing unit 16 reaches the terminal end in the main scanning direction, the controller 4 moves the printing medium 10 by a specified pitch in the sub-scanning direction, and executes next printing action in the main scanning direction. The printer 2, controller 4, and computer 8 are combined to make up a printing apparatus on the whole.

Figure 2:
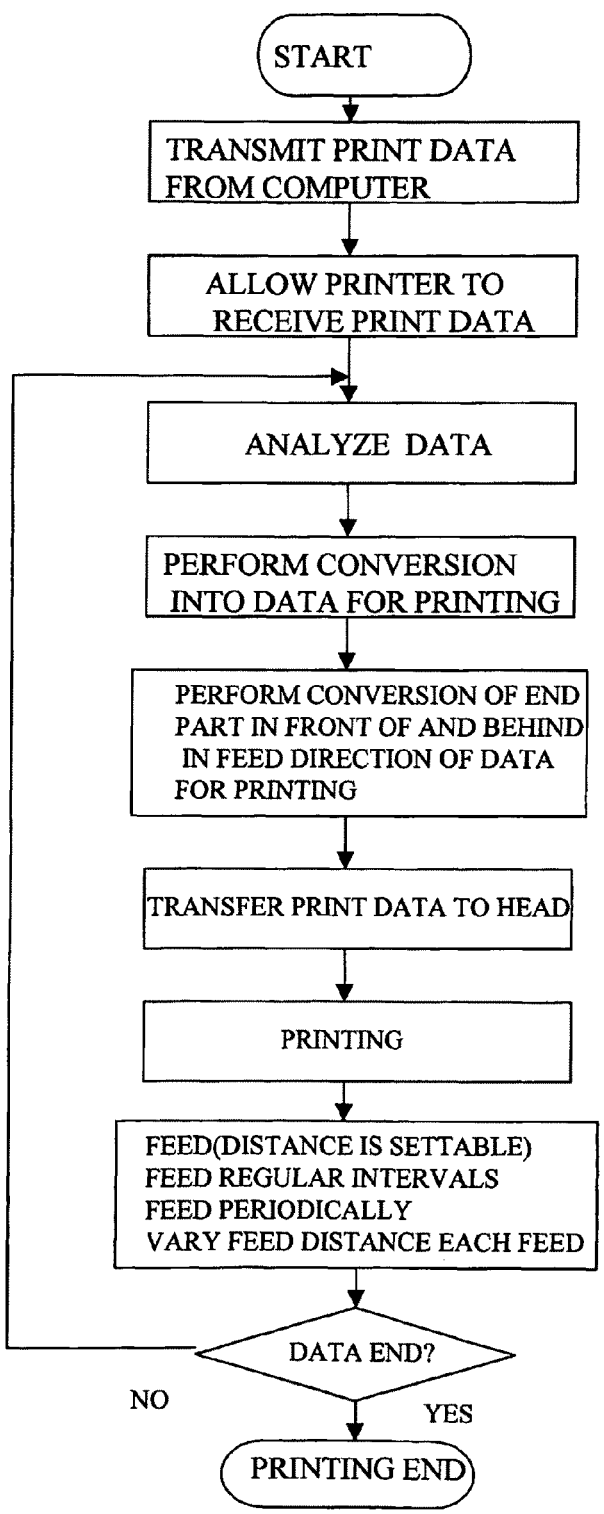
FIG. 2 is a flowchart showing operation of the present invention.

Referring now to FIG. 2, the printing operation of the printing apparatus of the present invention is described below.

Figure 3:
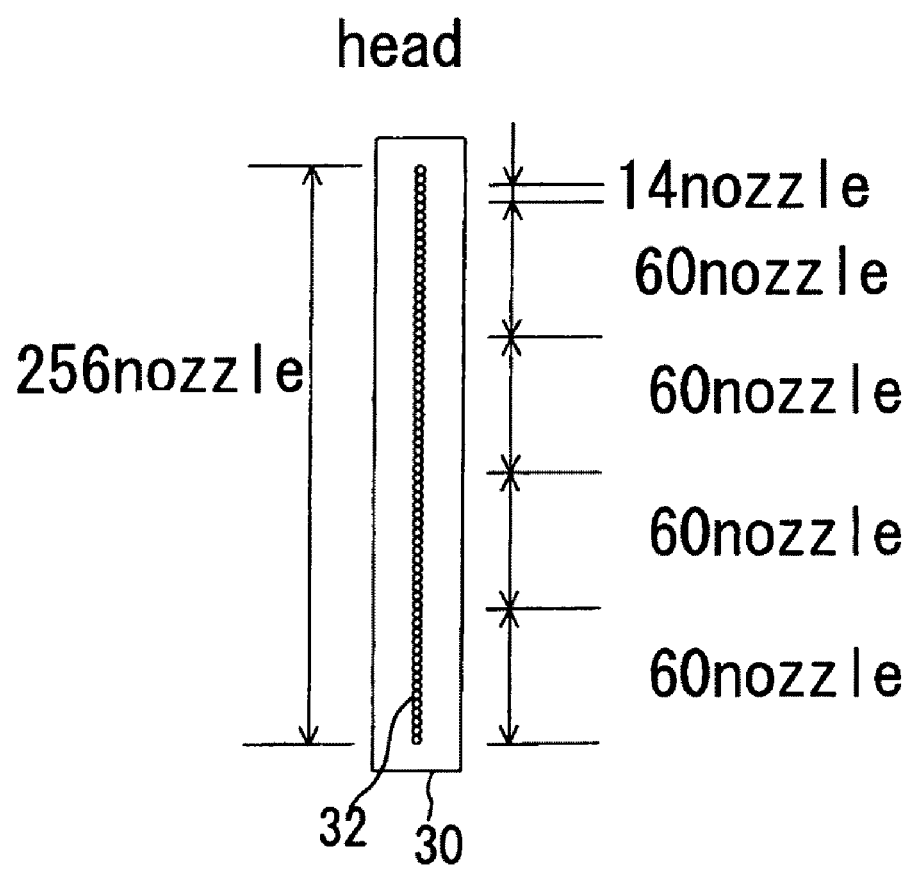
FIG. 3 is an explanatory diagram of a printing head.

The computer 8 creates print data to be printed out, such as sign characters, graphics, patterns and images. The printed data created in the computer 8 is transferred to the controller 4 by way of the connector 6 (steps 1, 2). The controller 4 receives the print data from the computer 8 according to the program stored in the memory, and analyzes the print data (step 3). A CMYK conversion unit of the controller 4 converts the colors of images into ink colors that can be printed by the printer 2. Consequently, the print data is converted into data for printing corresponding to the ink jet printing head (step 4). FIG. 3 shows a printing head 30.

The printing unit 16 includes a plurality of printing heads for discharging inks of corresponding colors, black (B), cyan (C), magenta (M), and yellow (Y). For the ease of explanation, herein, only one printing head 30 of the plurality of printing heads is explained. The configuration and operation of the other printing heads are same as in the printing head 30 described below. In the preferred embodiment, the printing head 30 has a total of 256 nozzles 32 arrayed in the sub-scanning direction. Of course, the resolution of the printing head 30 is not particularly specified, and the number of nozzles is not limited to 256. Among 256 nozzles, for example, when desired to complete printing in 4 four times of scanning, if one paper transfer distance is the portion of 60 nozzles, the portion of 240 nozzles corresponding to four times of 60 nozzles, and the portion of 14 nozzles for printing the end portion data are assigned as nozzles, and the printing is operated by using the total of 254 nozzles. Hence, the remaining two nozzles are not used. The number of nozzles to be used, the transfer distance, and the number of times of scanning may be changed as required.

Figure 5:
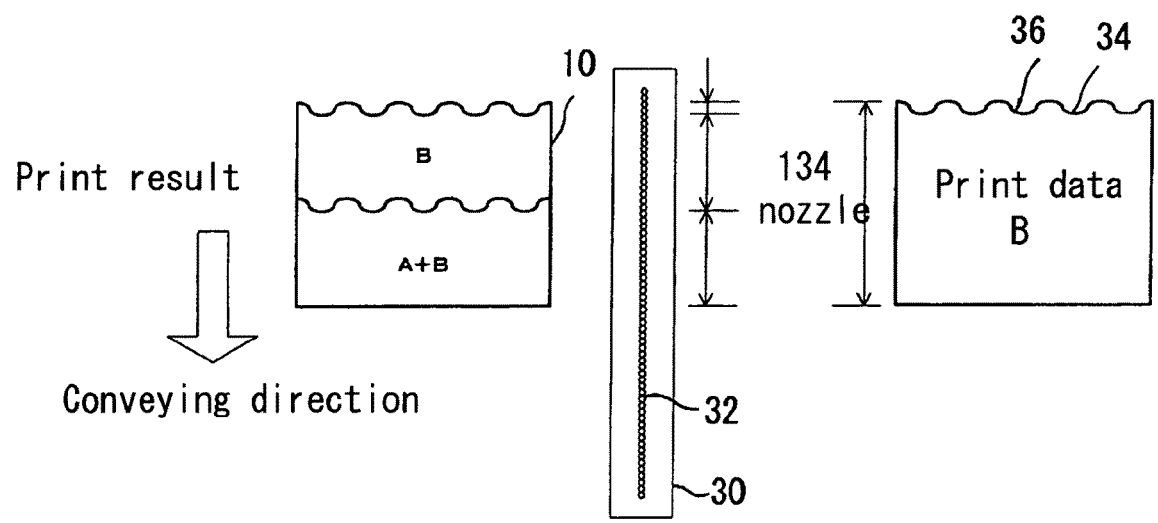
FIG. 5 is an explanatory diagram of the present invention.
Figure 6:
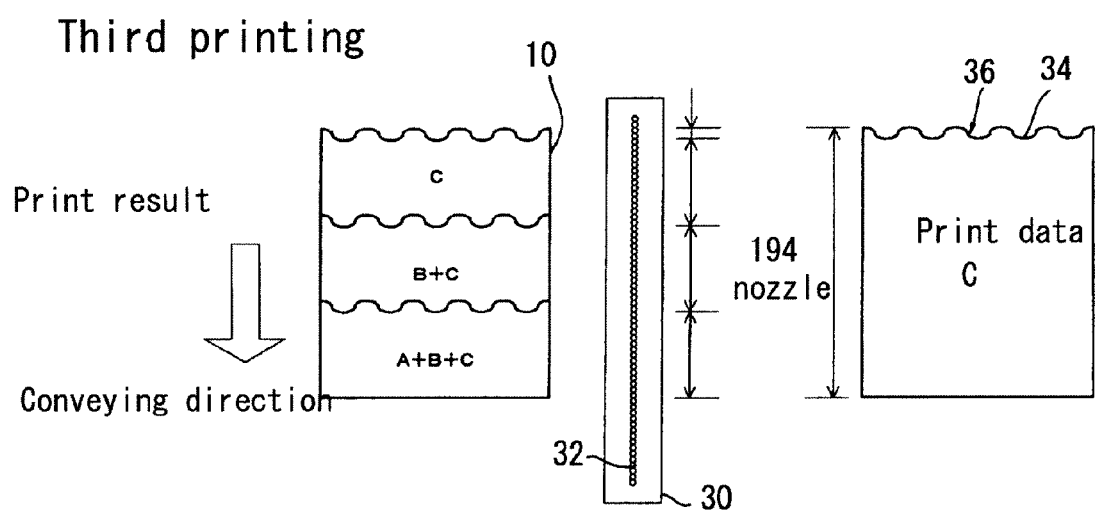
FIG. 6 is an explanatory diagram of the present invention.
Figure 7:
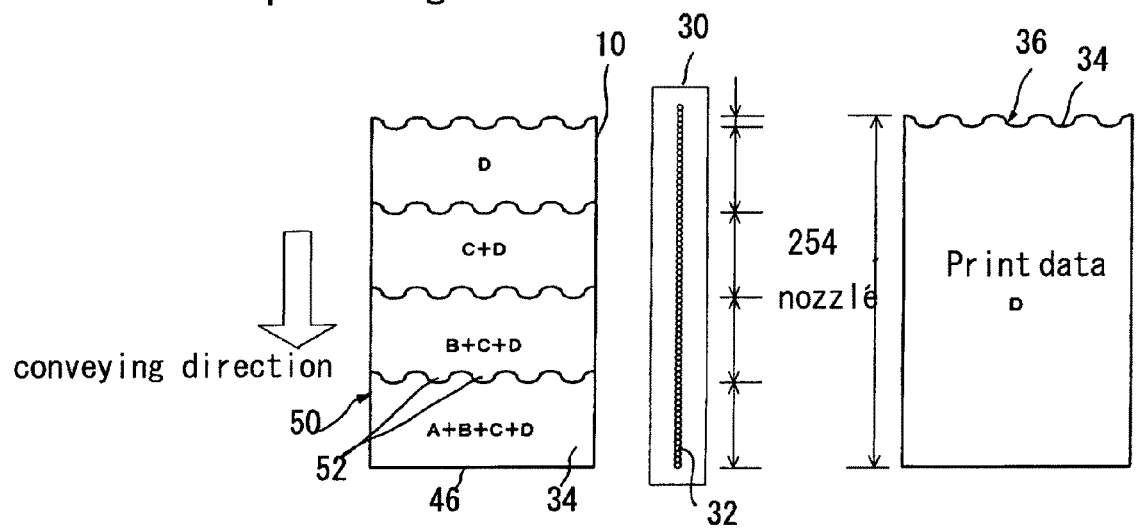
FIG. 7 is an explanatory diagram of the present invention.

FIG. 4 to FIG. 7 disclose print data A, B, C, D corresponding to initial four times of scanning of the printing head 30. As shown in FIG. 7, by four times of scanning by the printing head 30, printing of the image corresponding to a scanning region 33 of the portion of 60 nozzles is completed. The print data A corresponds to the portion of 74 nozzles of the printing head in the size in the sub-scanning direction of the data, and on the basis of the conveying direction of the printing medium 10, a deformed data portion 36 of waveform of the portion of 14 nozzles is formed at a rear end portion 34 (joint) of the main data portion. This deformed data portion is formed at all rear end portions 34 (joints) of print data A, B, C, D.

Figure 13:
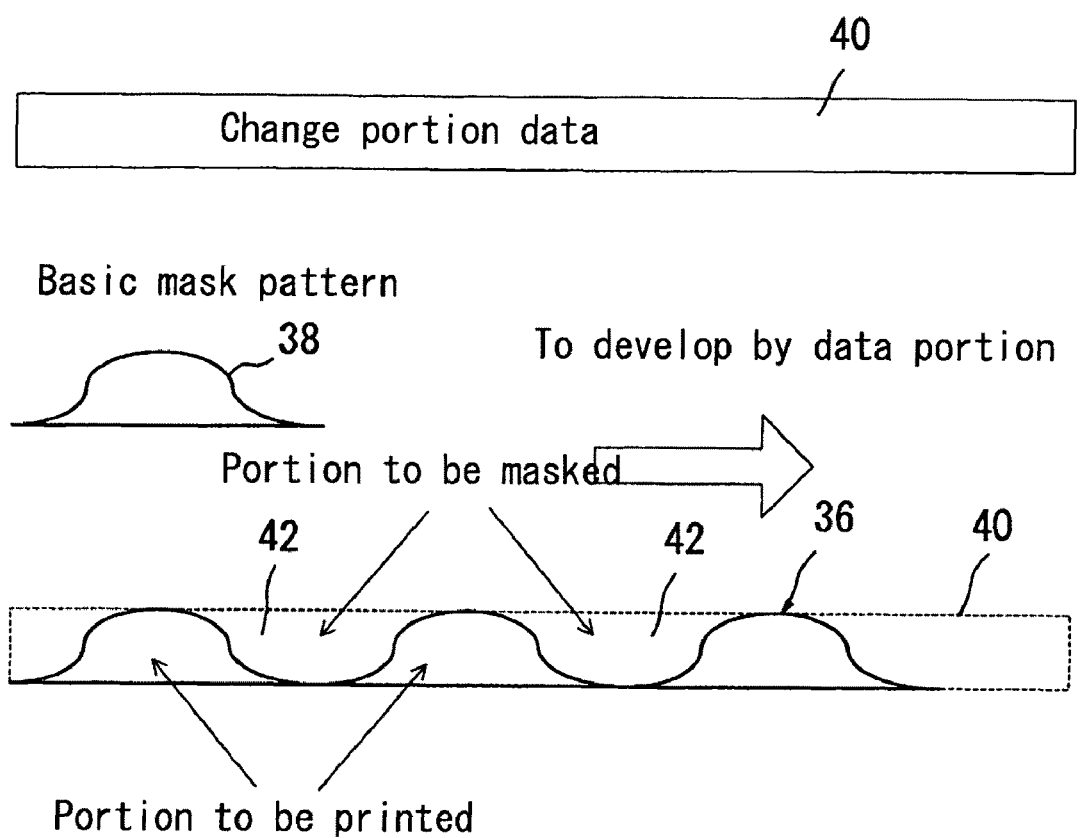
FIG. 13 is an explanatory diagram of the present invention.
Figure 14:
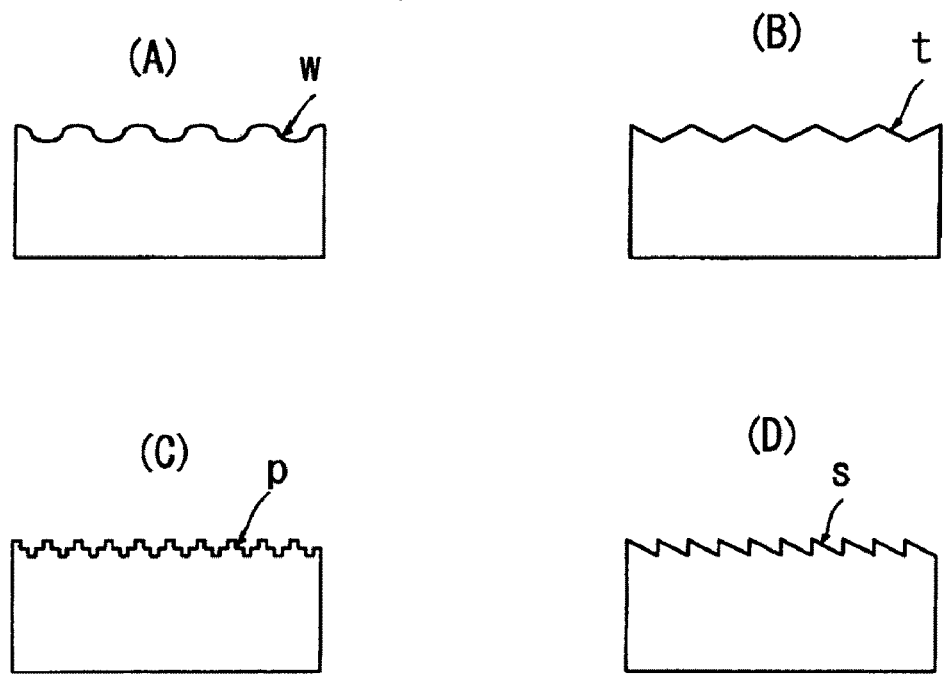
FIG. 14 is an explanatory diagram of the present invention.

FIG. 13 shows a generating method of deformed data portion 36. The controller 6 preliminarily stores a basic mask pattern 38 for creating the deformed data portion in the memory. The basic mask pattern 38 is, in the preferred embodiment, a waveform, and includes any undulated shapes shown in FIG. 14, such as waveform pattern (w), triangular pattern (t), protruding pattern (p), sawtooth pattern (s), and any other pattern of dots not arrayed continuously in the main scanning direction. The height and length of the waveform pattern may be set freely as required, and are not limited to the illustrated examples. When forming a deformed data portion 36 in the print data A, the data of the portion of the width of 14 nozzles adjacent to the rear end portion of the main data portion of the print data A is used as data 40 of the change portion, and the basic mask pattern 38 is connected to the waveform of the data 40 by developing as shown in FIG. 13, and the portion 42 out of the basic mask pattern 387 of the data 40 of the change portion is deleted, and the deformed data portion 36 in the waveform is created as shown in FIG. 4.

Figure 8:
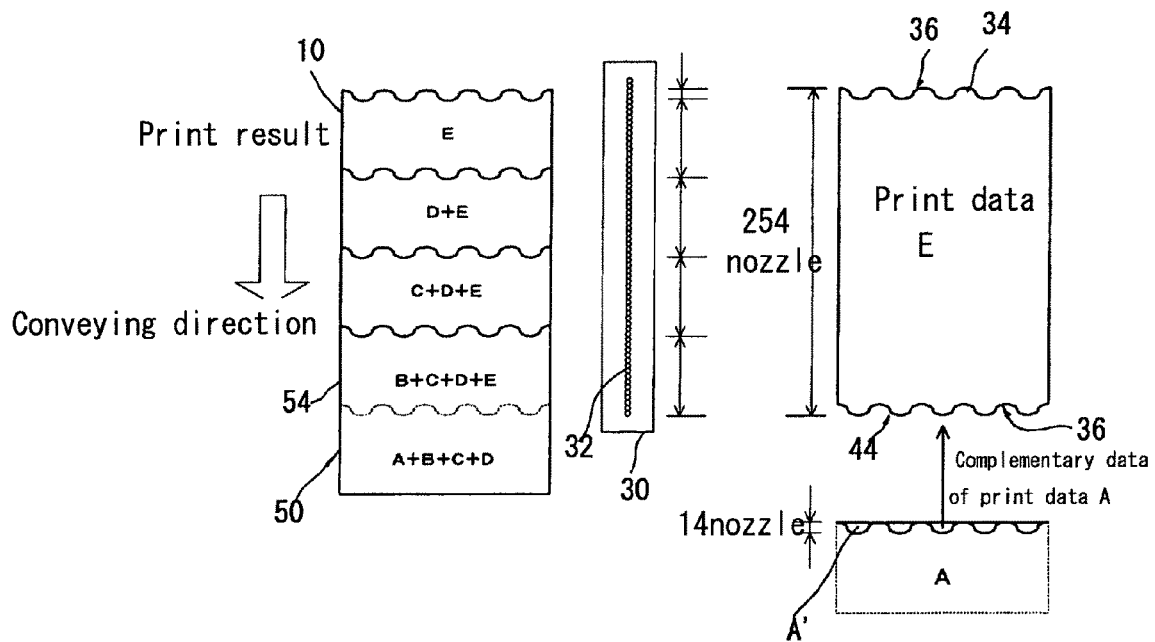
FIG. 8 is an explanatory diagram of the present invention.

In the print data A, the portion 42 deleted from the data 40 of the change portion is usually discarded, but is saved in the memory as the complementary data A1 of the print data A, and as described later, in the fifth printing action, it may be created as a supplement at the front end 44 of the print data E as shown in FIG. 8. The complementary data A' may be created in a similar procedure by inverting the vertical relation of the basic mask pattern 38. Among the print data, in the print data A, B, C, D including a front end portion 46 of the original image, that is, the print start end, a deformed data portion 36 is formed in the rear end portion 34 in the conveying direction, and in the print data F, G, H, I including a rear end portion 48 of the image, that is, the print end portion, a deformed data portion 36 is formed in the front end portion 44 in the conveying direction, and in the print data E in the intermediate portion not including front and rear end portions of the image, a deformed data portion 36 is formed in the front and rear end portions 44, 34 in the conveying direction. The joint side of the print data A, B, C, D, E, F, G, H, I forming the deformed data portions 36 are formed like waveforms.

As mentioned above, when the change process of front and rear end portions of conveying direction of print data is executed (step 5), the controller 4 transfers the print data to the printing head 30 (step 6), and the head unit 16 executes printing (step 7), and conveys the printing medium 10 (step 8), and the original image is printed on the printing medium 10. The operation at steps 7 and 8 is explained below while referring to FIG. 4 to FIG. 12.

Figure 4:
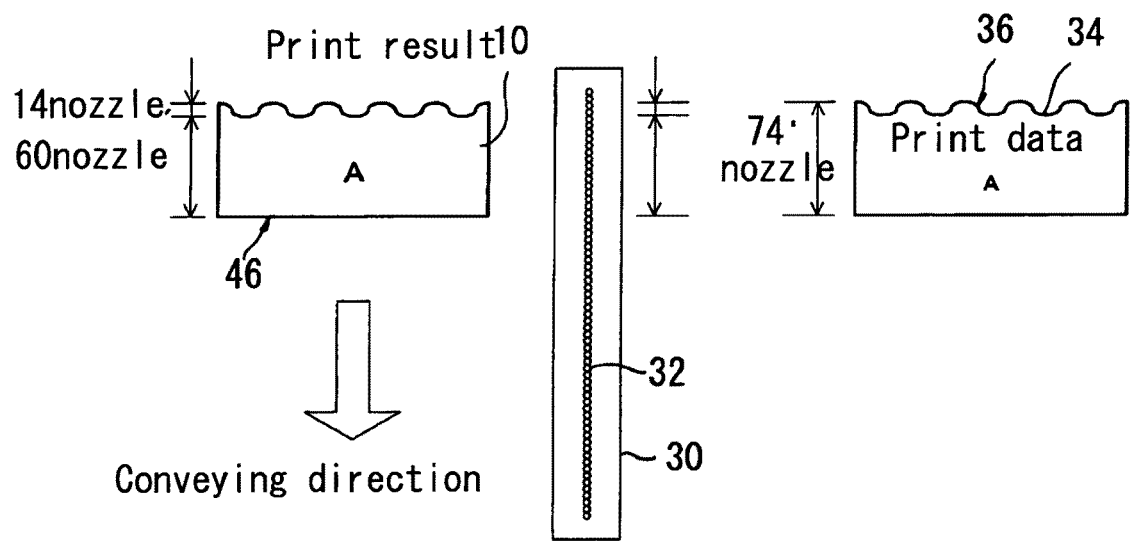
FIG. 4 is an explanatory diagram of the present invention.

FIG. 4 shows a first scanning by the printing head 30. When the printing head 30 completes a first scanning operation by its group of 74 nozzles, print data A of waveform shape at joint side is printed in the recording medium 10. The printing medium 10 is conveyed in the conveying direction by the portion of 60 nozzles. Next, as shown in FIG. 5, the printing head 30 moves in the main scanning direction, and executes a second printing, and print data B of waveform shape at joint side having a length corresponding to 134 nozzles is printed. When the second printing by the printing head 30 is over, the printing medium 10 is conveyed in the conveying direction by the portion of 60 nozzles. Thus, third and fourth printing are operated as shown in FIGS. 6 and 7.

When the fourth printing is completed, printing of a first region 50 corresponding to the length of 60 nozzles of the printing medium 10 is completed. This region 50 corresponds to A+B+C+D shown in FIG. 7, in which scanning is done four times by print data A, B, C, D, but a deletion portion 52 of deformed data portion is printed only three times by print data B, C, D. It is therefore necessary to complement the deletion portion 52. Next, as shown in FIG. 8, the printing medium 10 is conveyed in the conveying direction by the portion of 60 nozzles, and the printing head 30 is moved in the main scanning direction to execute fifth printing, and print data E having a length of 254 nozzles in the intermediate portion of the original image is printed. At this time, the data deletion portion 52 of the waveform deformed portion of the first region 50 is complemented by complementary data A' of the print data A. That is, the front end portion 44 (joint side) of print data E is created as deformed data portion 36 in the complementary data A' of the print data A.

Figure 9:
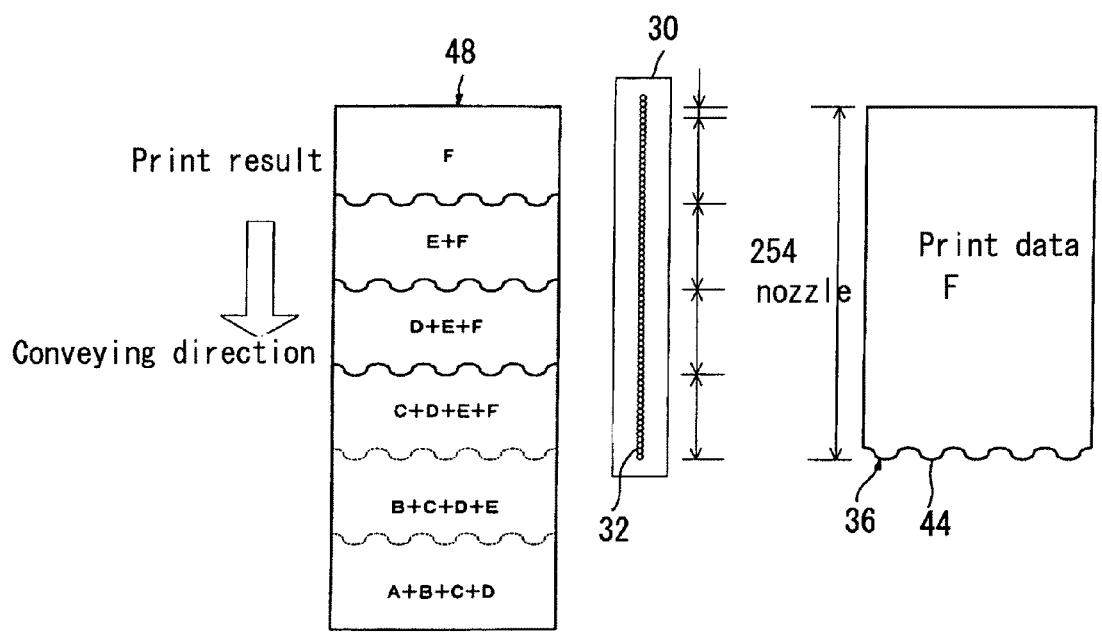
FIG. 9 is an explanatory diagram of the present invention.

The print data E having a length of 254 nozzles in the intermediate portion of one original image is created as deformed data portion 36 in the complementary data for complementing the deformed data portion of the adjacent region 50, at its front end portion 44. The waveform concave and convex shape of the deformed data portion 36 of the print data E, that is, at the joint side coincide precisely with the waveform concave and convex shapes at the joint side of the print data A. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 9. In the print data F, at its front end, deformed data portion 36 for complementing the deformed data portion 36 of the print data B is formed.

Figure 10:
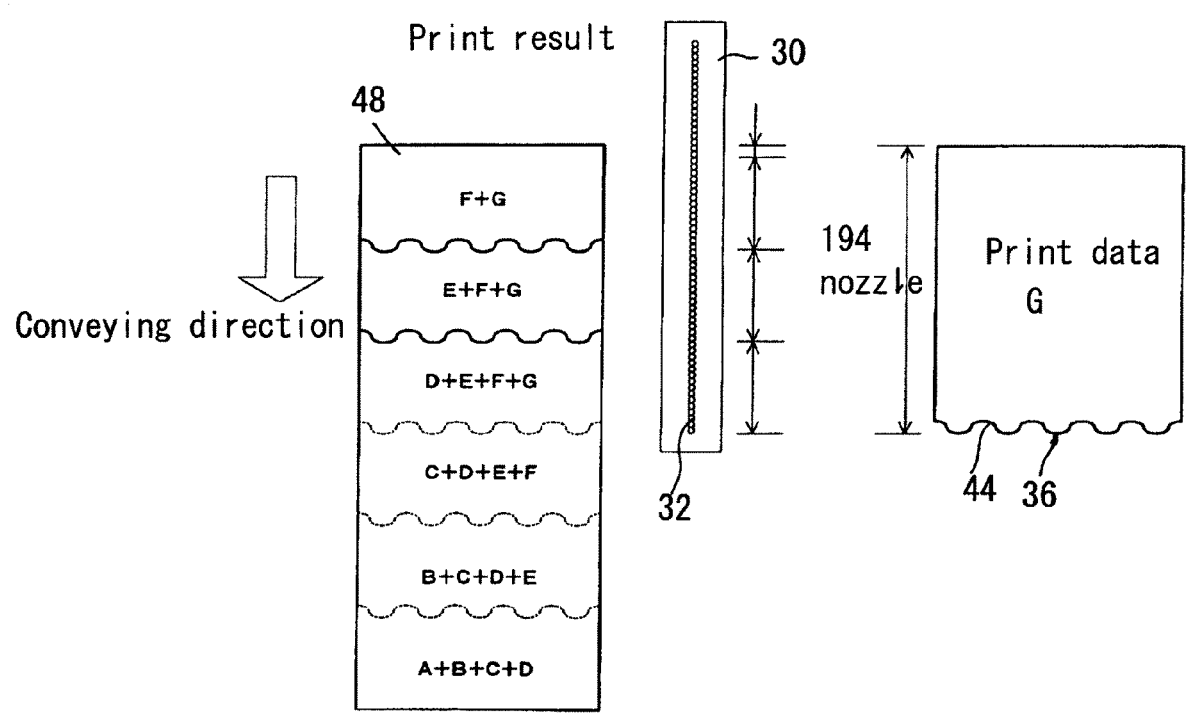
FIG. 10 is an explanatory diagram of the present invention.
Figure 11:
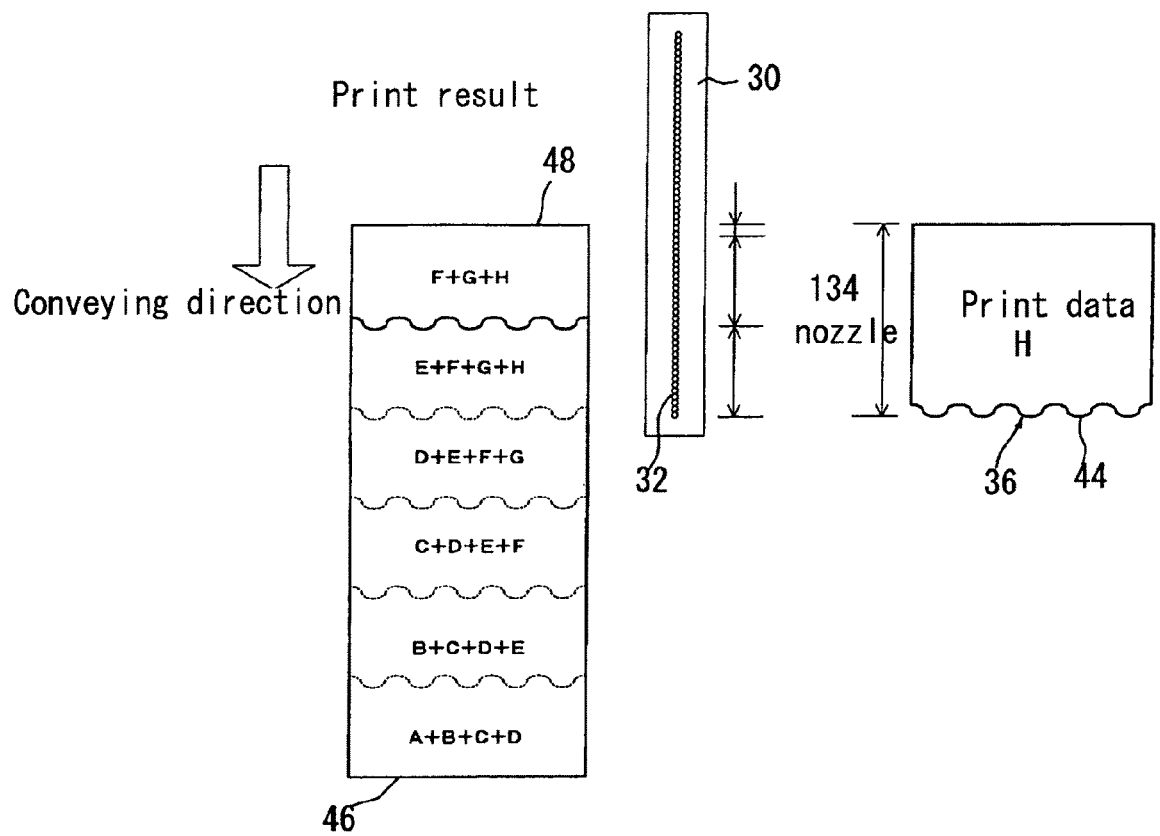
FIG. 11 is an explanatory diagram of the present invention.
Figure 12:
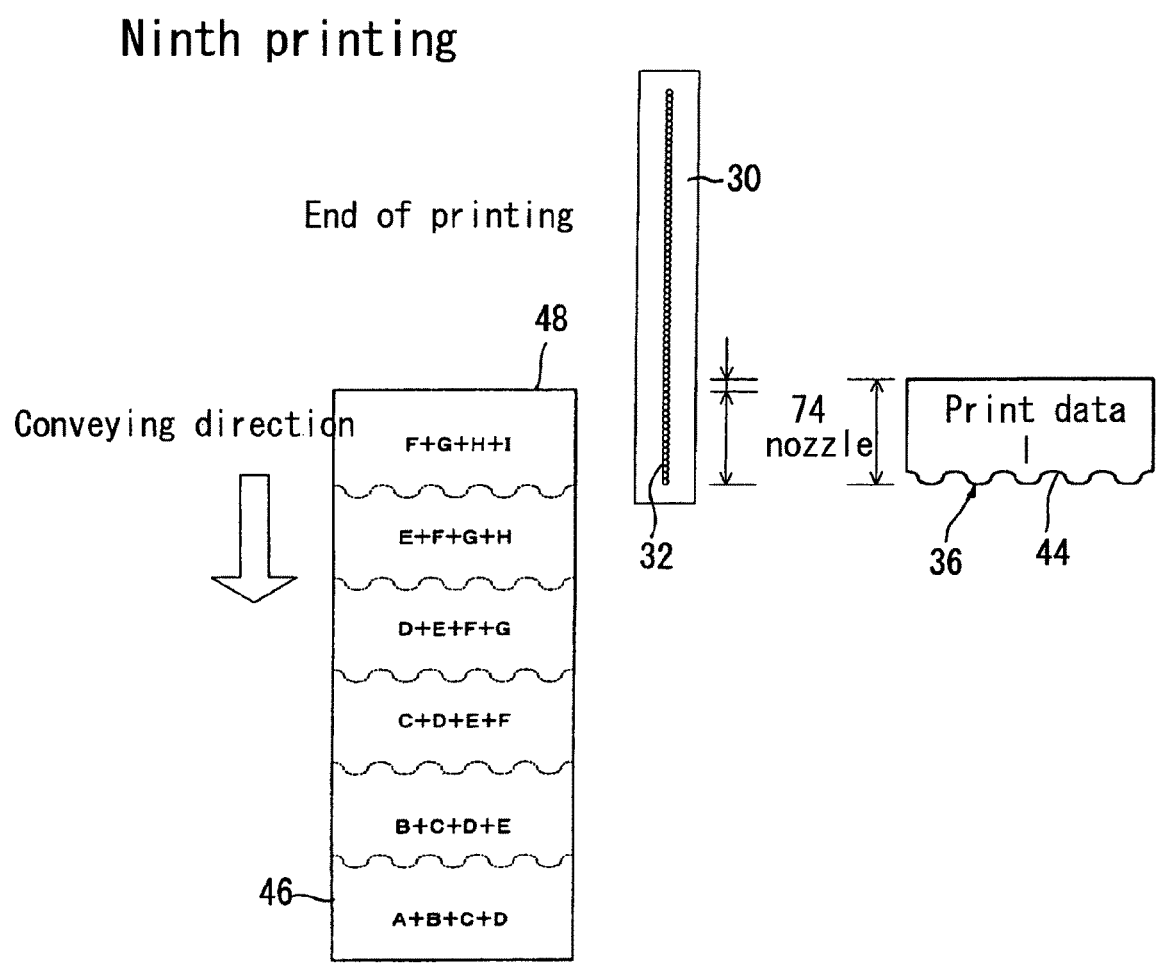
FIG. 12 is an explanatory diagram of the present invention.

The waveform concave and convex shape of the print data F at the joint side coincide precisely with the waveform concave and convex shapes of the print data B at the joint side. A seventh printing is executed by print data G in the length of 194 nozzles including the rear end portion 48 of the original image as shown in FIG. 10. In the print data G, at its front end, deformed data portion 36 for complementing the deformed data portion 36 of the print data C is formed. The waveform concave and convex shape of the print data G at the joint side coincide precisely with the waveform concave and convex shapes of the print data C at the joint side. An eighth printing is executed by print data H in the length of 134 nozzles including the rear end portion 48 of the original image as shown in FIG. 11. In the print data H, at its front end, deformed data portion 36 for complementing the deformed data portion 36 of the print data D is formed.

A ninth printing is executed by print data H in the length of 74 nozzles including the rear end portion 48 (printing terminal end) of the original image. In the print data I, at its front end portion 44, deformed data portion 36 for complementing the deformed data portion 36 of the print data E is formed. The waveform concave and convex shape of the deformed data portion 36 at the joint side with the print data I coincide precisely with the waveform concave and convex shapes of the print data E at the joint side, and thereby printing of the original image is completed. In the preferred embodiment, only the concept is explained, and where the data is continuous, a portion corresponding to data E is created (step 9), and data after F is created finally.

In the preferred embodiment, the printing medium is conveyed at equal pitches of 60 nozzles each as mentioned above, but the pitches may be changed in every conveying operation. It is intended to print dots between nozzle pitches when printing at small nozzle pitches, and equal pitches are 60 nozzles, but the pitches may be changed in every conveying operation by feeding 59 nozzles or by feeding 61 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not particularly specified in the preferred embodiment.

The controller 4 judges whether printing of data is complete at step 9 or not, and stops the printing if judged affirmatively. In the preferred embodiment, an ink jet printing having a head for discharging ink by using piezo elements is shown, but the present invention is not particularly limited to the ink jet printer using piezo elements, and may be also applied in the printer discharging ink by bubbles, or the printer having the head unit moving in lateral direction.

Other preferred embodiment of the present invention is described while referring to FIG. 2 and FIGS. 15 to 25. The configuration of the printing apparatus used in this preferred embodiment is same as in the printing apparatus in the first preferred embodiment shown in FIG. 1, and the printing operation is same as the flowchart shown in FIG. 2.

Figure 16:
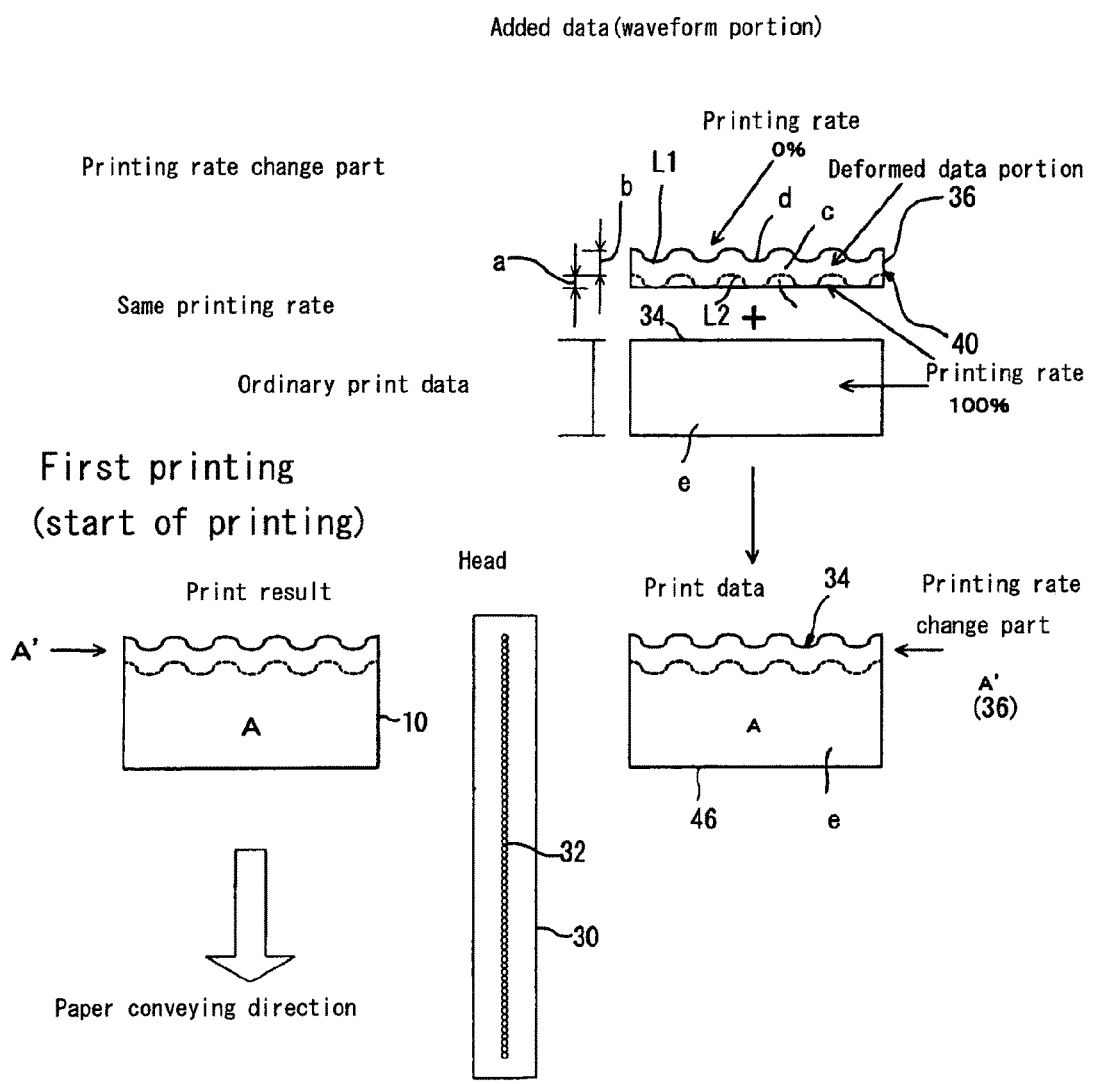
FIG. 16 is an explanatory diagram showing other embodiment of the present invention.

In this preferred embodiment, using the total of 256 nozzles of the printing head 30, if printing is completed, for example, in four times of scanning supposing one paper conveying distance to be a length of 50 nozzles, 200 nozzles, that is, 50 nozzles times 4, and 54 nozzles for printing end portion data are assigned as nozzles for printing, and the data is printed by using a total of 254 nozzles, and two other nozzles are not used. Of the 54 nozzles for printing the end portion data, as shown in FIG. 16, 18 nozzles are used for printing a region (a) including waveform portion (w) of 100% printing rate of deformed data portion 36 as mentioned below, and the remaining 36 nozzles are used for printing of printing rate change region (b) changed in the printing rate having concave and convex parts. The number of nozzles to be used, the conveying distance, and the number of times of scanning may be changed as desired.

Figure 17:
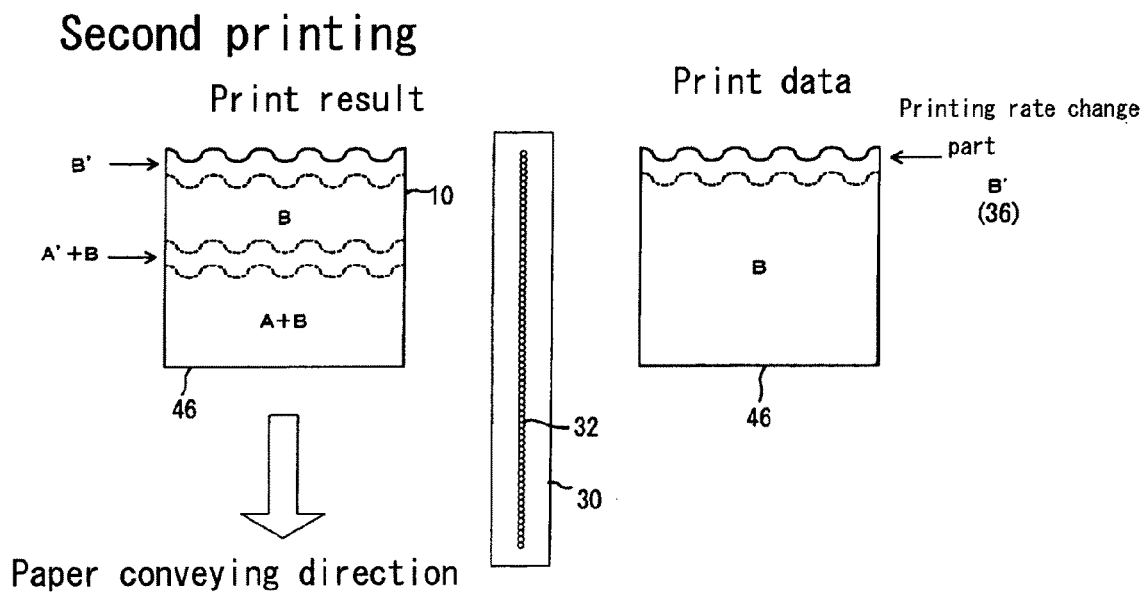
FIG. 17 is an explanatory diagram showing other embodiment of the present invention.
Figure 18:
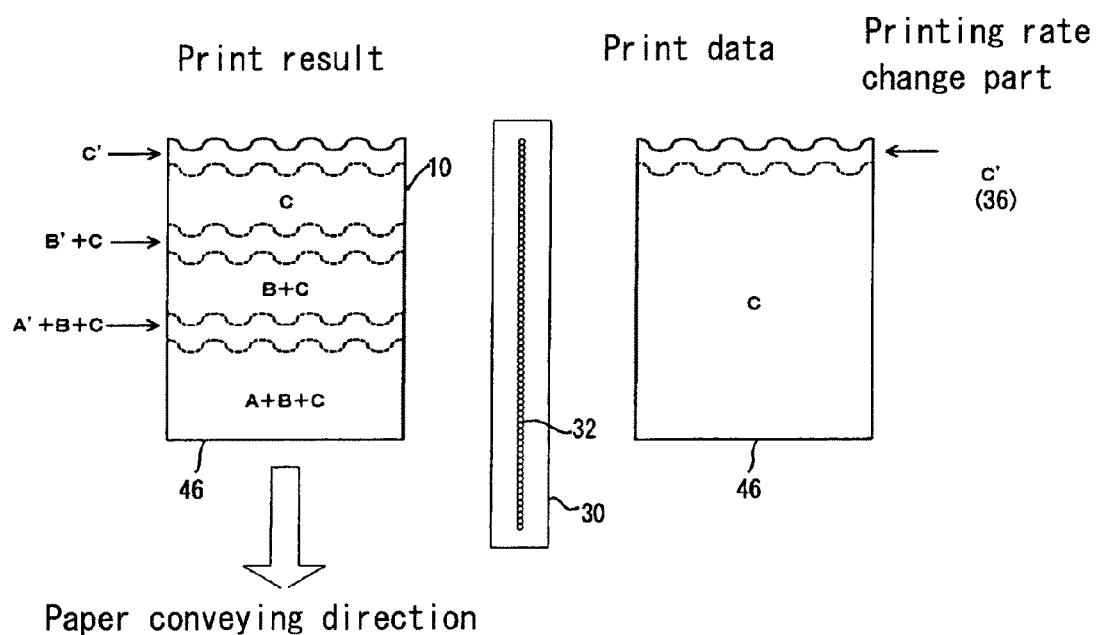
FIG. 18 is an explanatory diagram showing other embodiment of the present invention.
Figure 19:
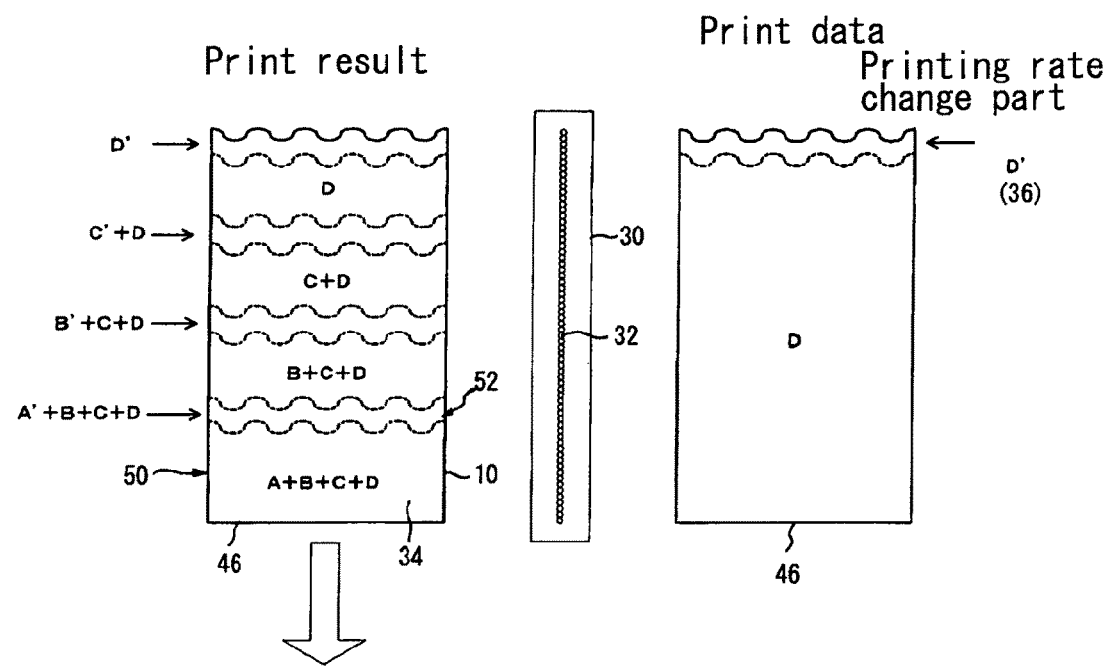
FIG. 19 is an explanatory diagram showing other embodiment of the present invention.

FIG. 16 to FIG. 19 disclose print data A, B, C, D corresponding to initial four times of scanning of the printing head 30. As shown in FIG. 19, by four times of scanning by the printing head 30, printing of the image corresponding to a scanning region 33 of the portion of 50 nozzles is completed. The print data A corresponds to the portion of 104 nozzles of the printing head in the size in the sub-scanning direction of the data, and on the basis of the conveying direction of the printing medium 10, a deformed data portion 36 of waveform of the portion of 54 nozzles is formed adjacently to a rear end portion 34 of main data portion (e). This deformed data portion 36 is formed at rear end portions 34 of all main data portions of print data A, B, C, D. Herein, the front end portion and the rear end portion are based on the conveying direction of the printing medium, that is, the sub-scanning direction in the printing apparatus.

Figure 15:
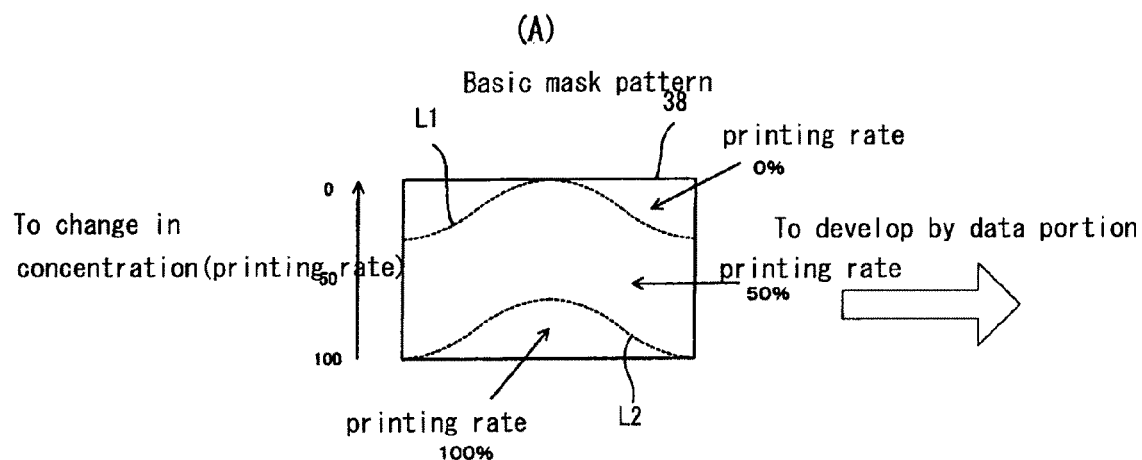
FIG. 15 is an explanatory diagram of the present invention.
Figure 15:
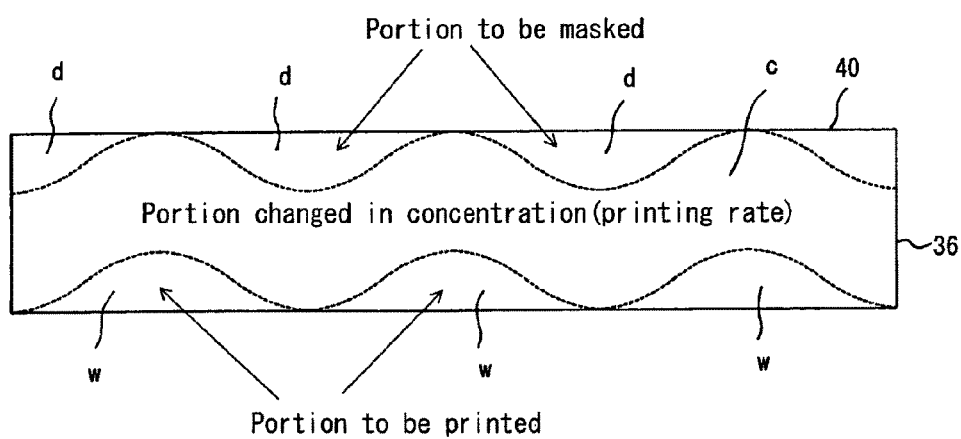

In the preferred embodiment, the deformed data portion 36 is composed of, as shown in FIG. 15 (B), waveform region (w) of 100% printing rate (density), printing rate changed region (c) of 50% printing rate, and waveform region (c) of 0% printing rate. As a result, the deformed data portions 36 formed in each print data are composed as shown in FIG. 1 (B), changing in the printing rate in the sub-scanning direction to 9%, 50% or 0%, 50%, 100% or 50%, 100%. Herein, the printing rate refers to the rate of printing of data required to be printed by one scanning, and the printing rate of 100% means that all data is printed completely (100%).

FIG. 15 shows a method of creating deformed data portion 36. The controller 6 stores a basic mask pattern 38 for creating the deformed data portion preliminarily in its memory. The basic mask pattern 38 is composed of a region of 0% printing rate, a region of 50% printing rate, and a region of 100% printing rate. Regions of 0% printing rate and 50% printing rate, and regions of 50% printing rate and 100% printing rate contact with each other in a waveform profile. An undulation line L1 formed in the boundary of 0% printing rate and 50% printing rate, and an undulation line L2 formed in the boundary of 50% printing rate and 100% printing rate are waveforms in the preferred embodiment, but are not limited, and may include triangular wave pattern, protruding pattern, sawtooth pattern, and any other pattern as far as dots are not arrayed continuously in the main scanning direction.

The height and length of the waveform patterns are not specified, may be set freely as required, and the patterns are not specified particularly. To create a deformed data portion 36 at the end portion of print data A, the data of the width portion of 64 nozzles adjacent to the rear end portion of main data portion (e) of print data A is data 50 of change portion, and by developing as shown in FIG. 15 (B) so that the waveform of basic mask pattern 38 may be connected to this data 40, and in the data 40 of change portion, a masked portion, that is, portion (d) free from dots, printing rate change portion (c) changed in the density to 50%, and portion (w) of 100% printing rate are formed.

Figure 25:
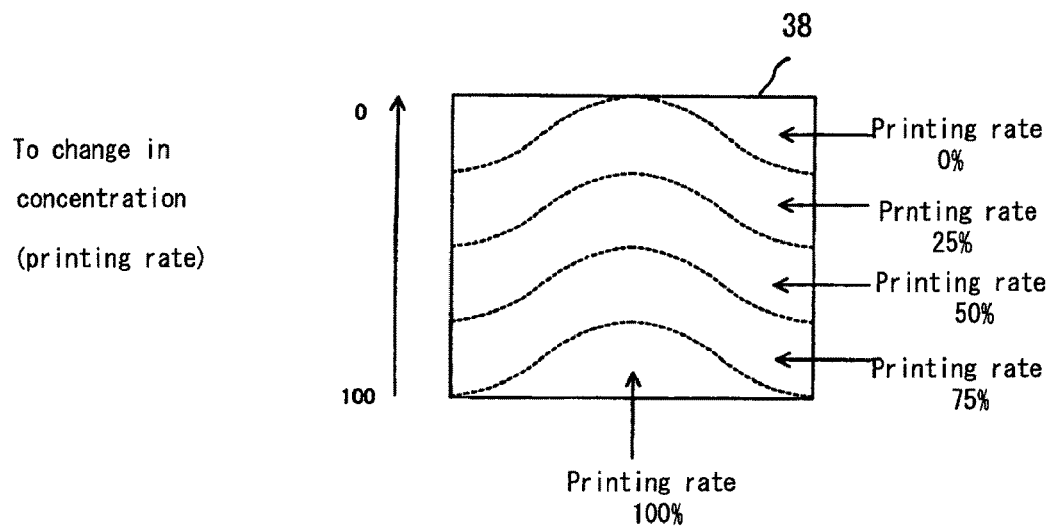
FIG. 25 is an explanatory diagram showing other embodiment of the present invention.

The printing rate change region (c) of 50% printing rate of the basic mask pattern is not particularly limited to a region of 50% printing rate alone, and is not limited to a single printing rate. As shown in FIG. 25, in the basic mask pattern 38, regions of plural printing rates may be provided, such as 0%, 25%, 50%, 75%, and 100%, and the data 40 may be formed in plural regions differing in the printing rate such as 0%, 25%, 50%, 75%, and 100%, and thus the regions may be composed to change in the printing rate in the sub-scanning direction. The deformed data portion 36 of each print data is determined by the basic mask pattern, and dot information of region (d) is deleted as shown in FIG. 15, and the dot information in region (c) is decimated according to the printing rate. The deleted and decimated dot information must be complemented when printing is completed in the deformed data portion of each print data.

Accordingly, the controller creates the complementary data and stores in the memory in every deformed data as the data for complementing the deleted and decimated dot information of deformed data portion of print data. As described below, in the printing operation after the fifth time, in the deformed data portion 36, the complementary data including the deleted and decimated dot information is overlapped and printed, and the deformed data portion 36 is complemented. For example, the 50% printing rate portion of the deformed data portion is complemented by the 50% printing rate portion of the complementary data. That is, the concentration distribution between deformed data portion 36 and complementary data for complementing the deformed data portion 36 is determined so that the summed total may be 100%. In this case, the complementary data is not limited to the data complemented by one printing operation, and the data may be complemented by plural times of printing. For example, the concentration change portion (c) of deformed data portion 36 printed at 50% printing rate (density) may be complemented by two times of printing by two portions of complementary data of 30% and 20% concentration. Also considering the drying effect of the ink by a heater on the printed surface, the printing rate may be distributed by complementing first by the complementary data of 80% concentration, then by the data of 20%.

By such composition, when drying the ink by a heater, first, if the ink amount is slightly larger, it is dried sufficiently by a longer time, but in a later printing process, since the drying time is shorter, the ink may not be dried sufficiently, and such problem is solved. This is not caused by the time, but the total amount of ink discharged in the place is larger by later printing than by first printing, and drying is easier when the later printing amount is decreased. The technique of varying the printing rate of deformed data portion and complementary data portion in the sub-scanning direction is not limited to the mask pattern operation, but may be applied to an operation of reproducibility by decimating dot information simply by calculation by using a controller. It may be also applied in an operation of changing the printing rate change portions other than 0% printing rate of deformed data portion 36 or complementary data finely and continuously by gradation technology. Of the print data A shown in FIG. 16, complementary data A" of deformed data portion 36 shown as print change portion A' is created by mask pattern (not shown) inverting the on (print) or off (delete) dot information of basic mask pattern 38 shown in FIG. 15 (A). This is the same in the other complementary data B", C", D", and E" described later.

Figure 20:
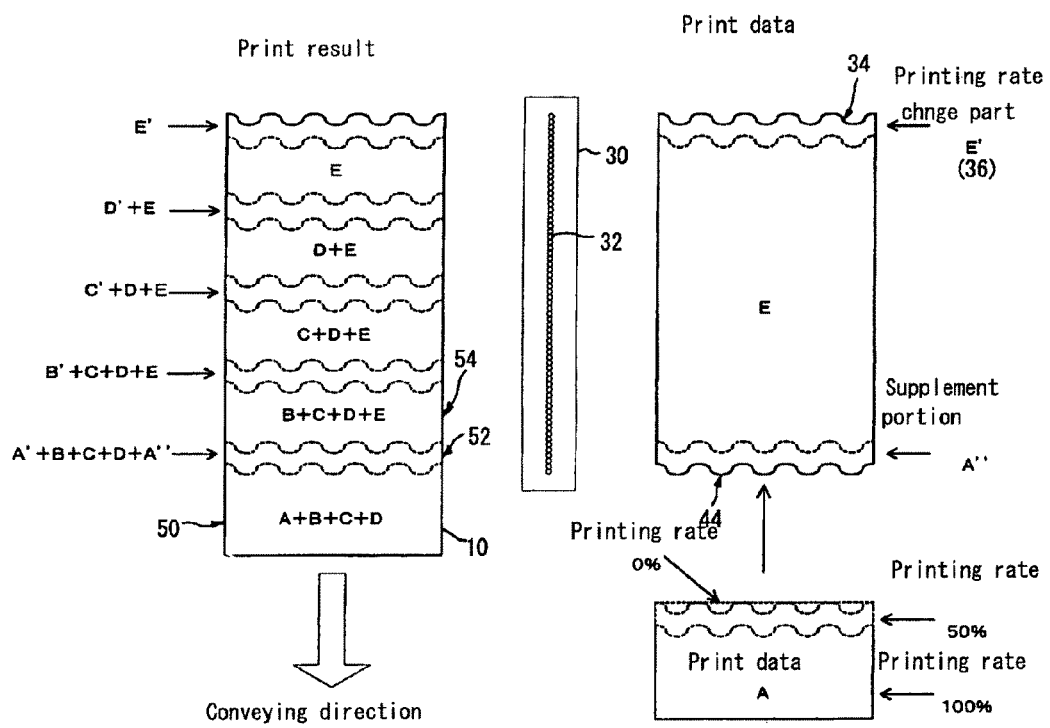
FIG. 20 is an explanatory diagram showing other embodiment of the present invention.

As shown in FIG. 16 to FIG. 19, out of the print data, in print data A, B, C, and D including the front end portion 46 or the printing start end of the original image, deformed data portions 36, that is, A', B', C', and D' are formed in the rear end portion 34 in the conveying direction, and as shown in FIG. 21 to FIG. 24, in print data F, G, H, and I including the rear end portion 48 or the printing terminal end of the original image, complementary data B", C", D", and E" are formed in the front end portion 44 in the conveying direction, and as shown in FIG. 20, in print data E of intermediate portion not including front and rear end portions of the original image, complementary data A" is formed in the front end portion in the conveying direction, and deformed data portion E' is formed in the rear end portion. The joint sides of print data A, B, C, D, E, F, G, H, and I forming deformed data portions and complementary data are shaped like waveforms.

In this manner, when the front and rear end portions of the print data in the conveying direction are changed (step 5), the controller 4 transfers the print data to the printing head 30 (step 6), and executes printing by the printing head 16 (step 7), and conveying of the printing medium 10 (step 8), and the original image is printed on the printing medium 10. The operation at steps 7 and 8 is explained below while referring to FIG. 16 to FIG. 24.

FIG. 16 shows a first scanning by the printing head 30. When the printing head 30 completes a first scanning operation by its group of 104 nozzles, print data A of waveform shape at joint side is printed in the recording medium 10. The printing medium 10 is conveyed in the conveying direction by the portion of 50 nozzles. Next, as shown in FIG. 17, the printing head 30 moves in the main scanning direction, and executes a second printing, and print data B of waveform shape at joint side having a length corresponding to 154 nozzles is printed. When the second printing by the printing head 30 is over, the printing medium 10 is conveyed in the conveying direction by the portion of 50 nozzles. Thus, third and fourth printing are operated as shown in FIGS. 18 and 19.

When the fourth printing is completed, printing of a first region 50 corresponding to the length of 50 nozzles of the printing medium 10 is completed. This region 50 corresponds to A+B+C+D shown in FIG. 8, in which scanning is done four times by print data A, B, C, D. But in a region 52 of 54 nozzles adjacent to the first region 50 of the printing medium 10, as indicated by A'+B+C+D, deformed data portion A' of print data A, and print data B, C, D are printed, and this region is not complemented yet by printing of dot information deleted and decimated from deformed data portion A'. Therefore, the deformed data portion A' must be complemented with complementary data A" including the complementary data of 50% concentration.

Next, as shown in FIG. 20, the printing medium 10 is conveyed in the conveying direction by the portion of 50 nozzles, and the printing head 30 is moved in the main scanning direction to execute fifth printing, and print data E having a length of 254 nozzles in the intermediate portion of the original image is printed. At this time, the data deleted and decimated portion of change data portion in region 52 is complemented by complementary data A' of the print data A. That is, at the front end portion 44 (joint side) of print data E, the complementary data A" composed of complementary data A" of the print data A is created.

Figure 21:
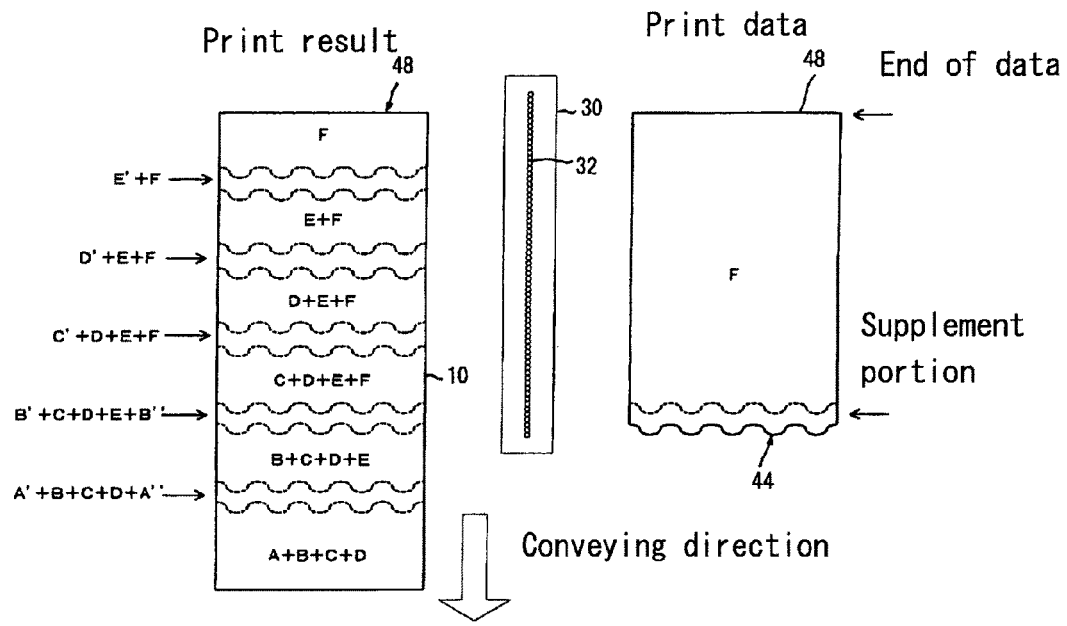
FIG. 21 is an explanatory diagram showing other embodiment of the present invention.

The print data E having a length of 254 nozzles in the intermediate portion of one original image is created as complementary data A" for complementing the deformed data portion A' of the adjacent region 50, at its front end portion 44. The waveform concave and convex shapes of the complementary data A" of the print data E, that is, at the joint side coincide precisely with the waveform concave and convex shapes at the joint side of the print data A. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 21. In the print data F, at its front end, complementary data B" for complementing deformed data portion 36 (B') of the print data B is formed.

Figure 22:
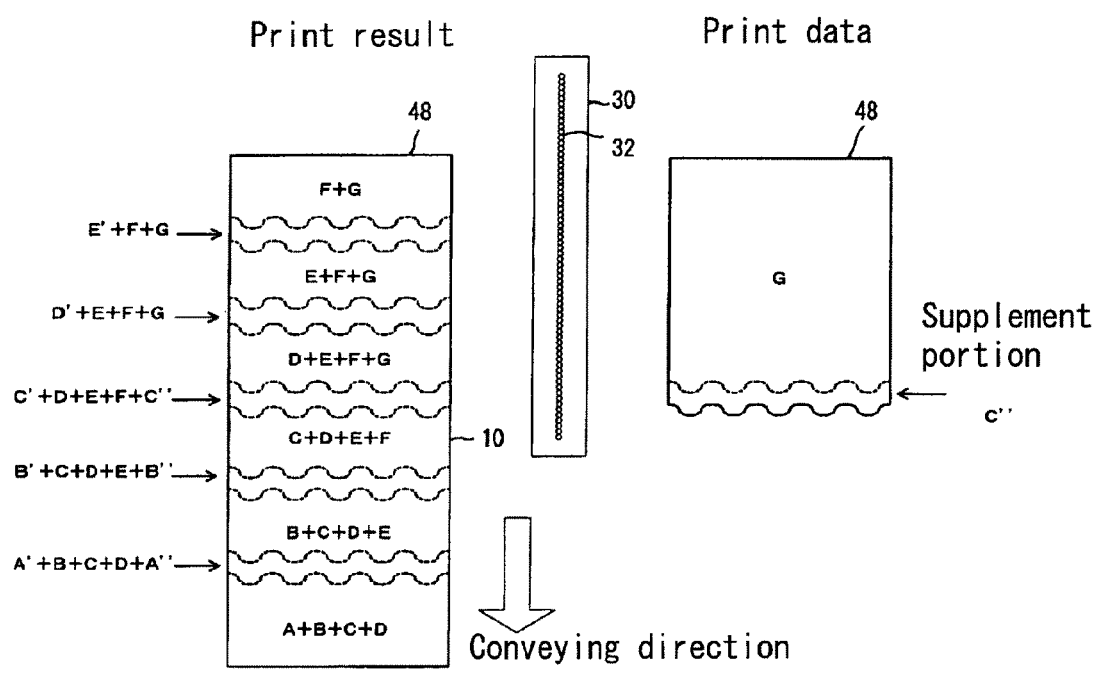
FIG. 22 is an explanatory diagram showing other embodiment of the present invention.

The waveform concave and convex shapes of the print data F at the joint side coincide precisely with the waveform concave and convex shapes of the print data B at the joint side. A seventh printing is executed by print data G in the length of 204 nozzles including the rear end portion 48 of the original image as shown in FIG. 22. In the print data G, at its front end, complementary data C" for complementing deformed data portion 36 (C') of the print data C is formed. The waveform concave and convex shapes of the print data G at the joint side coincide precisely with the waveform concave and convex shapes of the print data C at the joint side, and the complementary data C" is overlapped and printed on the deformed data portion C', and the deformed data portion C' of the print data C is complemented by the complementary data C".

Figure 23:
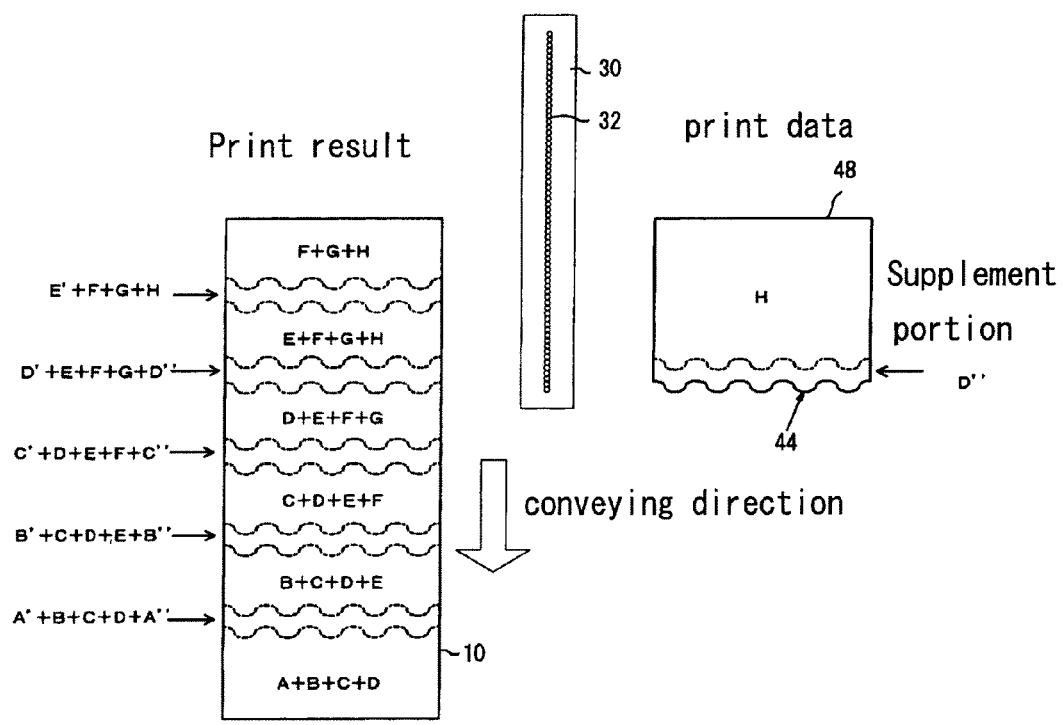
FIG. 23 is an explanatory diagram showing other embodiment of the present invention.
Figure 24:
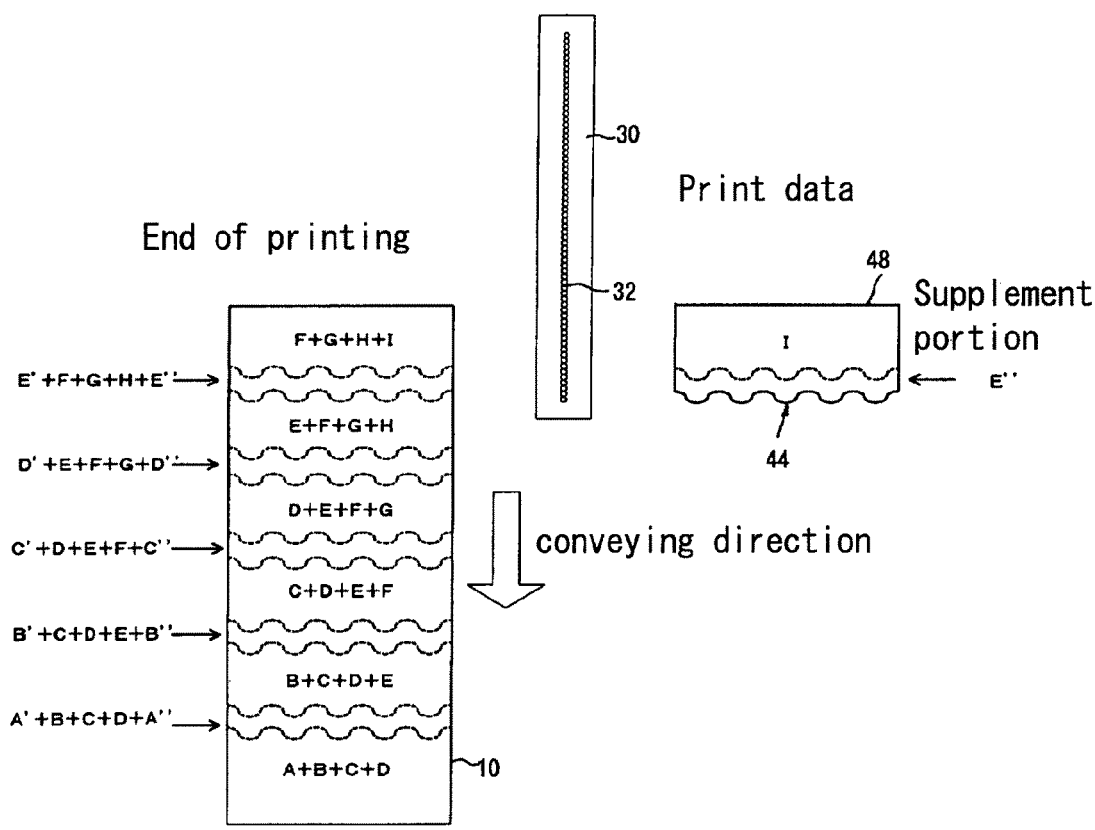
FIG. 24 is an explanatory diagram showing other embodiment of the present invention.

An eighth printing is executed by print data H in the length of 154 nozzles including the rear end portion 48 of the original image as shown in FIG. 23. In the print data H, at its front end, complementary data D" for complementing deformed data portion 36 (D') of the print data D is formed. The waveform concave and convex shapes of the print data H at the joint side coincide precisely with the waveform concave and convex shapes of the print data D at the joint side.

A ninth printing is executed by print data I in the length of 104 nozzles including the rear end portion 48 (printing terminal end) of the original image. In the print data I, at its front end portion 44, complementary data portion E" for complementing the print data E is formed.

The waveform concave and convex shapes of the deformed data portion 36 at the joint side with the print data I coincide precisely with the waveform concave and convex shapes of the print data E at the joint side, and thereby the deformed data portion 36 (E") of the print data E is complemented by the complementary data E", and printing of the original image is completed. In the preferred embodiment, only the concept is explained, and where the data is continuous, a portion corresponding to data E is created sequentially (refer to step 9 in FIG. 2), and data after F is created finally.

In the preferred embodiment, by forming the deformed data portion changed in printing rate at the joint of the print data, the printing regularity at the joint of print data is eliminated, and randomness is generated, and by the synergistic effect with the streak generation preventive effect of the concave and convex shapes of the deformed data portion, generation of streaks at the joint is prevented. Another effect is suppression of continuation of printing in lateral direction from a nozzle of poor printing precision positioned at the end when nozzles for discharging the ink are arrayed in parallel.

In the preferred embodiment, the printing medium is conveyed at equal pitches of 50 nozzles each as mentioned above, but the pitches may be changed in every conveying operation. It is intended to print dots between nozzle pitches when printing at small nozzle pitches, and equal pitches are 50 nozzles, but the pitches may be changed in every conveying operation by feeding 49 nozzles or by feeding 51 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not particularly specified in the preferred embodiment.

The controller 4 judges whether printing of data is complete at step 9 or not, and stops the printing if judged affirmatively.

Other preferred embodiment of the present invention is described while referring to FIG. 2 and FIGS. 16 to 24, and FIGS. 26 to 28.

The operation for forming the image in this preferred embodiment is same as in the operation in principle as in the second preferred embodiment shown in FIG. 16 to FIG. 24, and the explanation is omitted to avoid duplicate explanation.

In the preferred embodiment, deformed data portion 36 is composed of, as shown in FIG. 16, waveform region (w) of 100% printing rate (density), printing rate changed region (c) changing in the printing rate in the main scanning direction, that is, the head moving direction, and waveform region (c) of 0% printing rate. Herein, the printing rate refers to the rate of printing of data required to be printed by one scanning on the basis of 100, and the printing rate of 100% means that all of 100 data is printed completely (100%).

Figure 26:
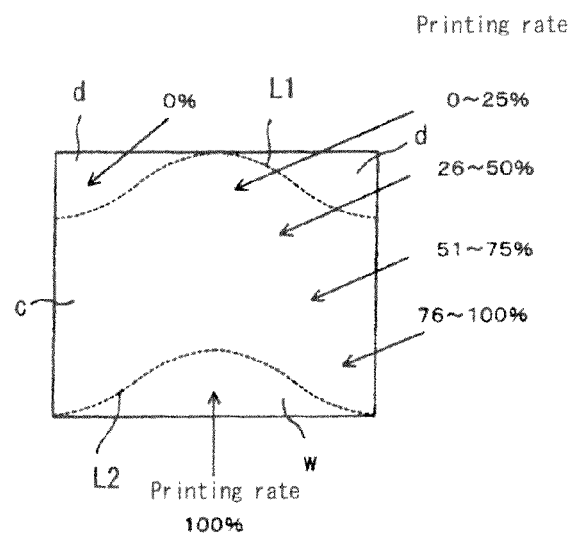
FIG. 26 is an explanatory diagram showing other embodiment of the present invention.
Figure 26:
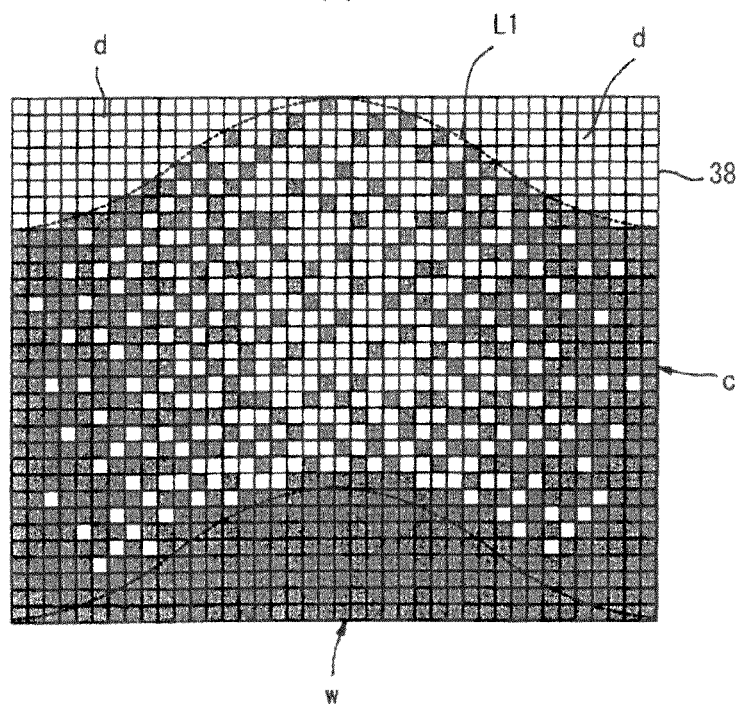
Figure 27:
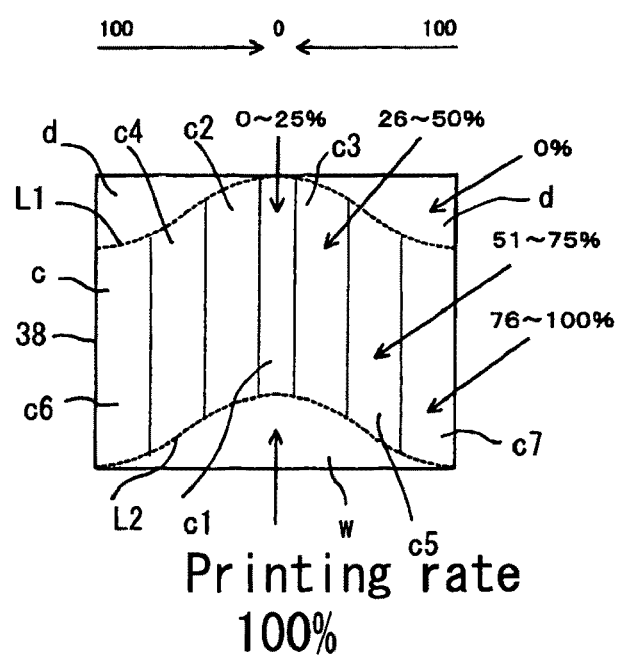
FIG. 27 is an explanatory diagram showing other embodiment of the present invention.

FIG. 26 shows a method of creating deformed data portion 36. The controller 6 stores a basic mask pattern 38 for creating the deformed data portion preliminarily in its memory. The basic mask pattern 38 is composed of a region (d) of 0% printing rate, a region (c) changed in the printing rate in the main scanning direction, and a region (w) of 100% printing rate. Further as shown in FIG. 27, the region (c) is segmented into a region c1 of 0 to 25% printing rate, regions c2, c3 of 26 to 50% printing rate, regions c4, c5 of 51 to 75% printing rate, and regions c6, c7 of 76 to 100% printing rate. The regions c1 to c7 are composed so as to be highest in the printing rate at the right and left end side, and gradually lower in the printing rate as going toward the center as shown in FIG. 27.

Figure 28:
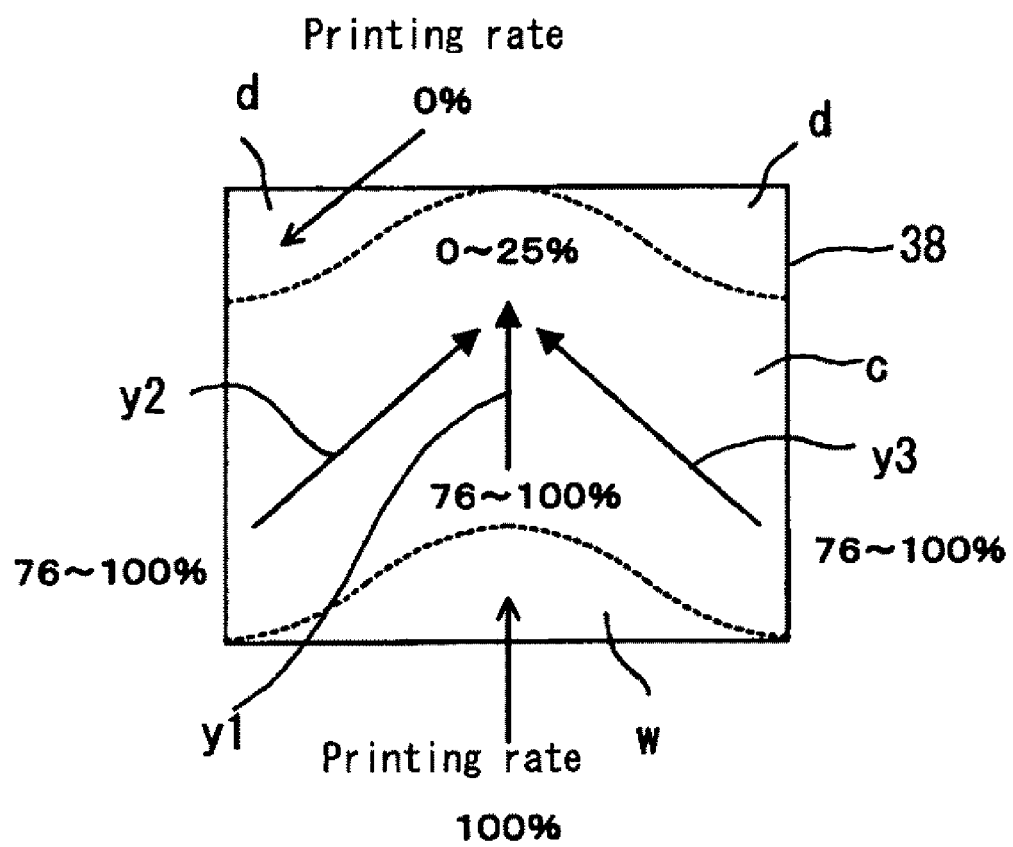
FIG. 28 is an explanatory diagram showing other embodiment of the present invention.

The basic mask pattern 38 changing in the printing rate in the main scanning direction is not limited to the profile shown in FIG. 27 in which the printing rate is changed only in the lateral direction (main scanning direction), but may be formed in a profile as shown in FIG. 28 in which the printing rate is changed in both longitudinal direction (sub-scanning direction) and lateral direction (main scanning direction). In FIG. 28, in the region (c) of basic mask pattern 28, the printing rate is changed from 76 to 100% to 0 to 25%, from lower part to upper part in the central region. The right and left regions of the region (c) are changed in the printing rate from 76 to 100% to 0 to 25% from lower part obliquely to central upper part.

In FIG. 28, arrow y1 indicates a state of printing rate of central part of region (c) becoming lower along the longitudinal direction (sub-scanning direction) in the direction of arrow, and arrows y2 and y3 indicate a state of printing rate in right and left regions of region (c) becoming lower along the longitudinal direction (sub-scanning direction) and lateral direction (main scanning direction) in the direction of arrow. The boundary of region (d) and region (c) of 0% printing rate, and region (c) and region (w) of 100% printing rate contact with each other in a waveform profile. An undulation line L1 formed in the boundary of region (d) and region (c) of 0% printing rate, and an undulation line L2 formed in the boundary of region (c) and region (w) of 100% printing rate are waveforms in the preferred embodiment, but are not limited, and may include triangular wave pattern, protruding pattern, sawtooth pattern, and any other pattern as far as dots are not arrayed continuously in the main scanning direction.

The height and length of the waveform patterns are not specified, may be set freely as required, and the patterns are not specified particularly. To create a deformed data portion 36 at the end portion of print data A, the data of the width portion of 54 nozzles adjacent to the rear end portion of main data portion (e) of print data A is data 40 of change portion, and by developing so that the waveform of basic mask pattern 38 may be connected to this data 40, and in the data 40 of change portion, a masked portion, that is, portion (d) free from dots, printing rate change portion (c) changed in the density as shown in FIG. 27, and portion (w) of 100% printing rate are formed. The printing rate change region (c) of the basic mask pattern 38 is not limited to a specific printing rate. The deformed data portion 36 of each print data is determined by the basic mask pattern, and dot information of region (d) is deleted as shown in FIG. 16, and the dot information in region (c) is decimated according to the printing rate. The deleted and decimated dot information must be complemented when printing is completed in the deformed data portion of each print data.

Accordingly, the controller creates the complementary data and stores in the memory in every deformed data as the data for complementing the deleted and decimated dot information of deformed data portion of print data. As described below, in the printing operation after the fifth time, in the deformed data portion 36, the complementary data including the deleted and decimated dot information is overlapped and printed, and the deformed data portion 36 is complemented. The concentration distribution between deformed data portion 36 and complementary data for complementing the deformed data portion 36 is determined so that the summed total may be 100%. In this case, the complementary data is not limited to the data complemented by one printing operation, and the data may be complemented by plural times of printing. For example, the concentration change portion (c) of deformed data portion 36 printed at 50% printing rate (density) may be complemented by two times of printing by two portions of complementary data of 30% and 20% concentration.

Also considering the drying effect of the ink by a heater on the printed surface, the printing rate may be distributed by complementing first by the complementary data of 80% or 70% concentration, then by the data of 20% or 30%. By such consideration, when drying the ink by a heater, first, if the ink amount is slightly larger, it is dried sufficiently by a longer time, but in a later printing process, since the drying time is shorter, the ink may not be dried sufficiently, and such problem is solved. This is not caused by the time, but the total amount of ink discharged in the place is larger by later printing than by first printing, and drying is easier when the later printing amount is decreased.

The technique of varying the printing rate of deformed data portion and complementary data portion in the sub-scanning direction is not limited to the mask pattern operation, but may be applied to an operation of reproducibility by decimating dot information simply by calculation by using a controller. It may be also applied in an operation of changing the printing rate change portions other than 0% printing rate of deformed data portion 36 or complementary data finely and continuously by gradation technology. Of the print data A shown in FIG. 16, complementary data A" of deformed data portion 36 shown as print change portion A' is created by mask pattern (not shown) inverting the on (print) or off (delete) dot information of basic mask pattern 38 shown in FIG. 15 (A). This is the same in the other complementary data B", C", D", and E" described later.

In the preferred embodiment, by forming the deformed data portion changed in printing rate at the joint of the print data, the printing regularity at the joint of print data is eliminated, and randomness is generated, and by the synergistic effect with the streak generation preventive effect of the concave and convex shapes of the deformed data portion, generation of streaks at the joint is prevented. Another effect is suppression of continuation of printing in lateral direction from a nozzle of poor printing precision positioned at the end when nozzles for discharging the ink are arrayed in parallel.

Another preferred embodiment of the present invention is described while referring to FIG. 2 and FIGS. 16 to 24, and FIGS. 29 to 31.

The configuration of the printing apparatus used in the preferred embodiment is same as the configuration of the first preferred embodiment shown in FIG. 1 and FIG. 2. The principle of the printing operation of the printing apparatus used in the preferred embodiment is same as in the printing operation in the second preferred embodiment, and the printing operation of the preferred embodiment is explained by referring to FIGS. 16 to 22 used in the explanation of the second preferred embodiment.

Figure 31:
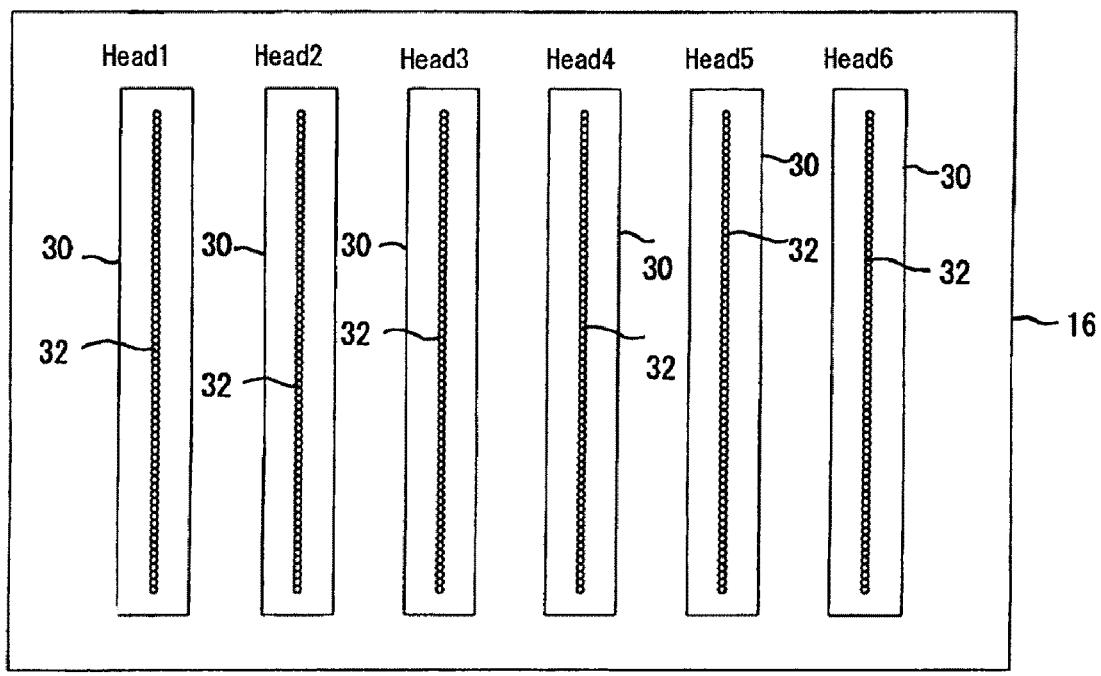
FIG. 31 is an explanatory diagram of a printing head.

The computer 8 creates the data to be printed out, such as sign characters, patterns, graphics, and print data. The print data created by the computer 8 is transferred to the controller 4 by way of the connector 6 (steps 1, 2). The controller 4 receives the print data from the computer 8 according to the program stored in the memory, and analyzes the print data (step 3). A CMYK conversion unit of the controller 4 converts the colors of pixels into ink colors that can be printed by the printer 2. Consequently, the print data is converted into data for printing corresponding to the ink jet printing head (step 4). FIG. 31 shows a printing head 30 used in this preferred embodiment.

The printing unit 16 includes six printing heads for discharging inks of corresponding colors, black (B), cyan (C), magenta (M), and yellow (Y). For the ease of explanation, herein, only one printing head 30 of the plurality of printing heads is explained. The configuration and operation of the other printing heads are same as in the printing head 30 described below. In the preferred embodiment, the printing head 30 has a total of 256 nozzles 32 arrayed in the sub-scanning direction. In the drawing, all nozzles are not shown because the space is limited. Of course, the resolution of the printing head 30 is not particularly specified, and the number of nozzles is not limited to 256.

The nozzle sequence of the printing head 30 may be formed either in a single row or in a plurality of rows. Among 256 nozzles, for example, when desired to complete printing in 4 four times of scanning, if one paper transfer distance is the portion of 50 nozzles, 200 nozzles, that is, 50 nozzles times 4, and 54 nozzles for printing end portion data are assigned as nozzles for printing, and the data is printed by using a total of 254 nozzles, and two other nozzles are not used. Of the 54 nozzles for printing the end portion data, as shown in FIG. 16, 18 nozzles are used for printing a region (a) including waveform portion (w) of 100% printing rate of deformed data portion 36 as mentioned below, and the remaining 36 nozzles are used for printing of printing rate change region (b) changed in the printing rate having concave and convex parts. The number of nozzles to be used, the conveying distance, and the number of times of scanning may be changed as desired.

FIG. 16 to FIG. 19 disclose print data A, B, C, D corresponding to initial four times of scanning of the printing head 30. As shown in FIG. 19, by four times of scanning by the printing head 30, printing of the image corresponding to a scanning region 33 of the portion of 50 nozzles is completed. As shown in FIG. 6, print data A corresponds to the portion of 104 nozzles of the printing head in the size in the sub-scanning direction of the data, and on the basis of the conveying direction of the printing medium 10, a deformed data portion 36 of waveform of the portion of 54 nozzles is formed adjacently to a rear end portion 34 of main data portion (e). This deformed data portion 36 is formed at rear end portions 34 of all main data portions of print data A, B, C, D. Herein, the front end portion and the rear end portion are based on the conveying direction of the printing medium, that is, the sub-scanning direction in the printing apparatus.

In the preferred embodiment, the deformed data portion 36 is composed of, as shown in FIG. 16, waveform region (w) of 100% printing rate (density), printing rate change region (c) of 50% printing rate, and waveform region (d) of 0% printing rate. The printing rate of the printing rate change region (c) is not limited to 50% printing rate alone, but may be various values. The printing rate may be changed from 0% to 100% in gradual steps or continuously in the sub-scanning direction or main scanning direction. Herein, the printing rate refers to the rate of printing of data required to be printed by one scanning, and the printing rate of 100% means that all data is printed completely (100%).

Figure 29:
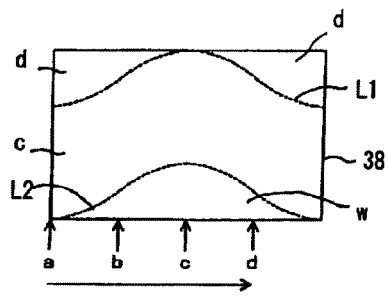
FIG. 29 is an explanatory diagram showing other embodiment of the present invention.
Figure 29:
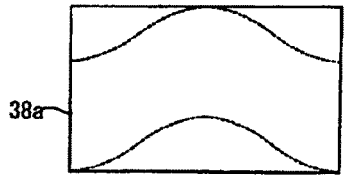
Figure 29:
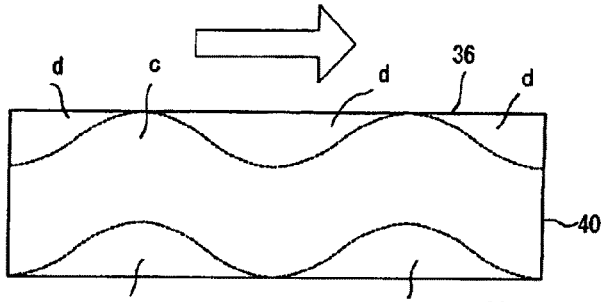
Figure 29:
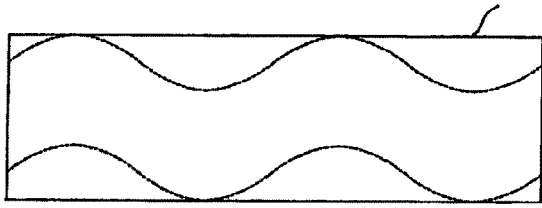
Figure 29:
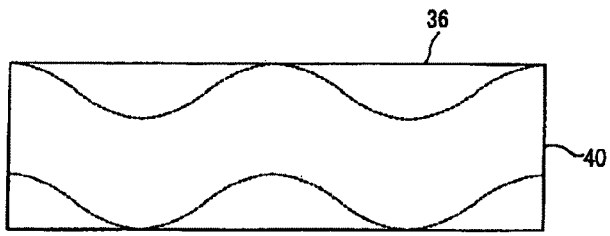
Figure 29:

FIG. 29 shows a method of creating deformed data portion 36. The controller 6 stores a basic mask pattern 38 for creating the deformed data portion preliminarily in its memory. The basic mask pattern 38 is composed of a region (d) of 0% printing rate, a region (c) changed in the printing rate in the main scanning direction, and a region (w) of 100% printing rate. The boundary of region (d) and region (c) of 0% printing rate and region (c) and region (w) of 100% printing rate contact with each other in a waveform profile. An undulation line L1 formed in the boundary of region (d) and region (c) of 0% printing rate, and an undulation line L2 formed in the boundary of region (c) and region (w) of 100% printing rate are waveforms in the preferred embodiment, but are not limited, and may include triangular wave pattern, protruding pattern, sawtooth pattern, and any other pattern as far as dots are not arrayed continuously in the main scanning direction. The height and length of the waveform patterns are not specified, may be set freely as required, and the patterns are not specified particularly.

To create a deformed data portion 36 at the end portion of print data A, the data of the width portion of 54 nozzles adjacent to the rear end portion of main data portion (e) of print data A is data 40 of change portion, and by developing so that the waveform of basic mask pattern 38 may be connected to this data 40, and in the data 40 of change portion, a masked portion, that is, portion (d) free from dots, printing rate change portion (c) changed in the density, and portion (w) of 100% printing rate are formed. The printing range change region (c) of the basic mask pattern 38 is not limited to a specific printing region. The deformed data portion 36 of each print data is determined by the basic mask pattern 38, and the dot information in region (d) is deleted as shown in FIG. 16, and the dot information in the region (c) is decimated according to the printing rate. In the preferred embodiment, aside from the generation of deformed data portion by the basic mask pattern data 38a of the basic mask pattern 38, the phase of the basic mask pattern 38 is deviated in phase, and a plurality of mask pattern data 38b, 38c, 38d are created, and a deformed data portion 336 is created in the print data on the basis thereof.

Mask pattern data 38a starting from point (a) on the axis of abscissas (position) of basic mask pattern 38 as start point of the period of dot deletion and decimation pattern is shown as a basic form in FIG. 29 (B). Mask pattern data 38b starting from point (b) deviated in phase from point (a) of basic mask pattern 38 as start point of pattern period is shown as a developed form from the portion (b). Mask pattern data 38c starting from point (c) of basic mask pattern 38 as start point of pattern period is shown as a developed form from the portion (c). Mask pattern data 38d starting from point (d) of basic mask pattern 38 as start point of pattern period is shown as a developed form from the portion (d). In the preferred embodiment, the print data having deformed data portion 36 deformed by the mask pattern data 38a is supplied to No. 1, 3, and 5 printed heads 30, and the print data having deformed data portion 36 deformed by the mask pattern data 38c is supplied to No. 2, 4, and 6. Of course, the combination of the mask pattern data and the printing heads are not limited to these examples alone. The dot information deleted and decimated from the data 40 of each print data must be complemented when printing of the deformed data portion of each print data is complemented.

Accordingly, the controller creates the complementary data and stores in the memory in every deformed data as the data for complementing the deleted and decimated dot information of deformed data portion of print data. As described below, in the printing operation after the fifth time, in the deformed data portion 36, the complementary data including the deleted and decimated dot information is overlapped and printed, and the deformed data portion 36 is complemented. The concentration distribution between deformed data portion 36 and complementary data for complementing the deformed data portion 36 is determined so that the summed total may be 100%. In this case, the complementary data is not limited to the data complemented by one printing operation, and the data may be complemented by plural times of printing. For example, the concentration change portion (c) of deformed data portion 36 printed at 50% printing rate (density) may be complemented by two times of printing by two portions of complementary data of 30% and 20% concentration. Moreover, by grouping the printing heads into Nos. 1, 2, Nos. 3, 4, No. 5 and No. 6, the same effects are obtained by using four mask patterns, smaller than the number of printing heads.

Also considering the drying effect of the ink by a heater on the printed surface, the printing rate may be distributed by complementing first by the complementary data of 80% or 90% concentration, then by the data of 20% or 10%. By such consideration, when drying the ink by a heater, first, if the ink amount is slightly larger, it is dried sufficiently by a longer time, but in a later printing process, since the drying time is shorter, the ink may not be dried sufficiently, and such problem is solved. This is not caused by the time, but the total amount of ink discharged in the place is larger by later printing than by first printing, and drying is easier when the later printing amount is decreased. The technique of varying the printing rate of deformed data portion and complementary data portion in the sub-scanning direction is not limited to the mask pattern operation, but may be applied to an operation of reproducibility by decimating dot information simply by calculation by using a controller.

It may be also applied in an operation of changing the printing rate change portions of deformed data portion 36 or complementary data finely and continuously by gradation technology. In the preferred embodiment, as shown in FIG. 31, the printing head 16 uses six printing heads 30 No. 1 to No. 6, and prints in six colors. FIGS. 16 to 24 show the printing operation of the No. 1 printing head 30 out of six printing heads 30. In the preferred embodiment, in the No. 1 printing head 30, print data creating a deformed data portion 36 by the mask pattern data 38a shown in FIG. 29 (B) is entered. The printing operation of other No. 2 to No. 6 printing heads 30 is same as the printing operation of No. 1 printing head 30, and the explanation is omitted.

Of the print data A shown in FIG. 16, complementary data A" of deformed data portion 36 shown as print change portion A' is created by mask pattern (not shown) inverting the on (print) or off (delete) dot information of basic mask pattern 38 shown in FIG. 29 (A). This is the same in the other complementary data B", C", D", and E" described later.

As shown in FIG. 16 to FIG. 19, out of the print data, in print data A, B, C, and D including the front end portion 46 or the printing start end of the original image, deformed data portions 36, that is, A', B', C', and D' are formed in the rear end portion 34 in the conveying direction, and as shown in FIG. 21 to FIG. 24, in print data F, G, H, and I including the rear end portion 48 or the printing terminal end of the original image, complementary data B", C", D", and E" are formed in the front end portion 44 in the conveying direction, and as shown in FIG. 20, in print data E of intermediate portion not including front and rear end portions of the original image, complementary data A" is formed in the front end portion in the conveying direction, and deformed data portion E' is formed in the rear end portion.

The joint sides of print data A, B, C, D, E, F, G, H, and I forming deformed data portions and complementary data are shaped like waveforms.

In this manner, when the front and rear end portions of the print data in the conveying direction are changed (step 5), the controller 4 transfers the print data to the printing head 30 (step 6), and executes printing by the printing head 16 (step 7), and conveying of the printing medium 10 (step 8), and the original image is printed on the printing medium 10. The operation at steps 7 and 8 is explained below while referring to FIG. 16 to FIG. 24. FIG. 16 to FIG. 24 show, for the ease of understanding, the print data forming the deformed data portion and complementary data created by the mask pattern data not deviated in phase, by referring only to the printing operation by the No. 1 printing head 30, and the printing operation by the other printing heads is omitted.

FIG. 16 shows a first scanning by the printing head 30. When the printing head 30 completes a first scanning operation by its group of 104 nozzles, print data A of waveform shape at joint side is printed in the recording medium 10. The printing medium 10 is conveyed in the conveying direction by the portion of 50 nozzles. Next, as shown in FIG. 17, the printing head 30 moves in the main scanning direction, and executes a second printing, and print data B of waveform shape at joint side having a length corresponding to 154 nozzles is printed. When the second printing by the printing head 30 is over, the printing medium 10 is conveyed in the conveying direction by the portion of 50 nozzles. Thus, third and fourth printing are operated as shown in FIGS. 18 and 19.

When the fourth printing is completed, printing of a first region 50 corresponding to the length of 50 nozzles of the printing medium 10 is completed. This region 50 corresponds to A+B+C+D shown in FIG. 18, in which scanning is done four times by print data A, B, C, D. But in a region 52 of 54 nozzles adjacent to the first region 50 of the printing medium 10, as indicated by A'+B+C+D, deformed data portion A' of print data A, and print data B, C, D are printed, and this region is not complemented yet by printing of dot information deleted and decimated from deformed data portion A'. Therefore, the deformed data portion A' must be complemented with complementary data A" including the complementary data of 50% concentration.

Next, as shown in FIG. 20, the printing medium 10 is conveyed in the conveying direction by the portion of 50 nozzles, and the printing head 30 is moved in the main scanning direction to execute fifth printing, and print data E having a length of 254 nozzles in the intermediate portion of the original image is printed. At this time, the data deleted and decimated portion of change data portion in region 52 is complemented by complementary data A' of the print data A. That is, at the front end portion 44 (joint side) of print data E, the complementary data A" composed of complementary data A" of the print data A is created.

The print data E having a length of 254 nozzles in the intermediate portion of one original image is created as complementary data A" for complementing the deformed data portion A' of the adjacent region 50, at its front end portion 44. The waveform concave and convex shapes of the complementary data A" of the print data E, that is, at the joint side coincide precisely with the waveform concave and convex shapes at the joint side of the print data A. As a result, at the joint (boundary) of the first region 50 and second region 54 of the printing medium 10, lines continuously extending in the main scanning direction are not formed, and streak-like phenomenon does not appear in the scanning direction of the head. This is the same at the joints with other regions of the printing medium 10. A sixth printing is executed by print data F in the length of 254 nozzles including the rear end portion 48 of the original image as shown in FIG. 22. In the print data F, at its front end, complementary data B" for complementing deformed data portion 36 (B') of the print data B is formed.

The waveform concave and convex shapes of the print data F at the joint side coincide precisely with the waveform concave and convex shapes of the print data B at the joint side. A seventh printing is executed by print data G in the length of 204 nozzles including the rear end portion 48 of the original image as shown in FIG. 21. In the print data G, at its front end, complementary data C" for complementing deformed data portion 36 (C') of the print data C is formed. The waveform concave and convex shapes of the print data G at the joint side coincide precisely with the waveform concave and convex shapes of the print data C at the joint side, and the complementary data C" is overlapped and printed on the deformed data portion C', and the deformed data portion C' of the print data C is complemented by the complementary data C".

An eighth printing is executed by print data H in the length of 154 nozzles including the rear end portion 48 of the original image as shown in FIG. 23. In the print data H, at its front end, complementary data D" for complementing deformed data portion 36 (D') of the print data D is formed. The waveform concave and convex shapes of the print data H at the joint side coincide precisely with the waveform concave and convex shapes of the print data D at the joint side. A ninth printing is executed by print data I in the length of 104 nozzles including the rear end portion 48 (printing terminal end) of the original image. In the print data I, at its front end portion 44, complementary data portion E" for complementing the deformed data portion 36 (E') of the print data E is formed.

The waveform concave and convex shapes of the deformed data portion 36 at the joint side with the print data I coincide precisely with the waveform concave and convex shapes of the print data E at the joint side, and thereby the deformed data portion 36 (E') of the print data E is complemented by the complementary data E", and printing of the original image is completed. In the preferred embodiment, only the concept is explained, and where the data is continuous, a portion corresponding to data E is created sequentially (step 9), and data after F is created finally.

Figure 30:
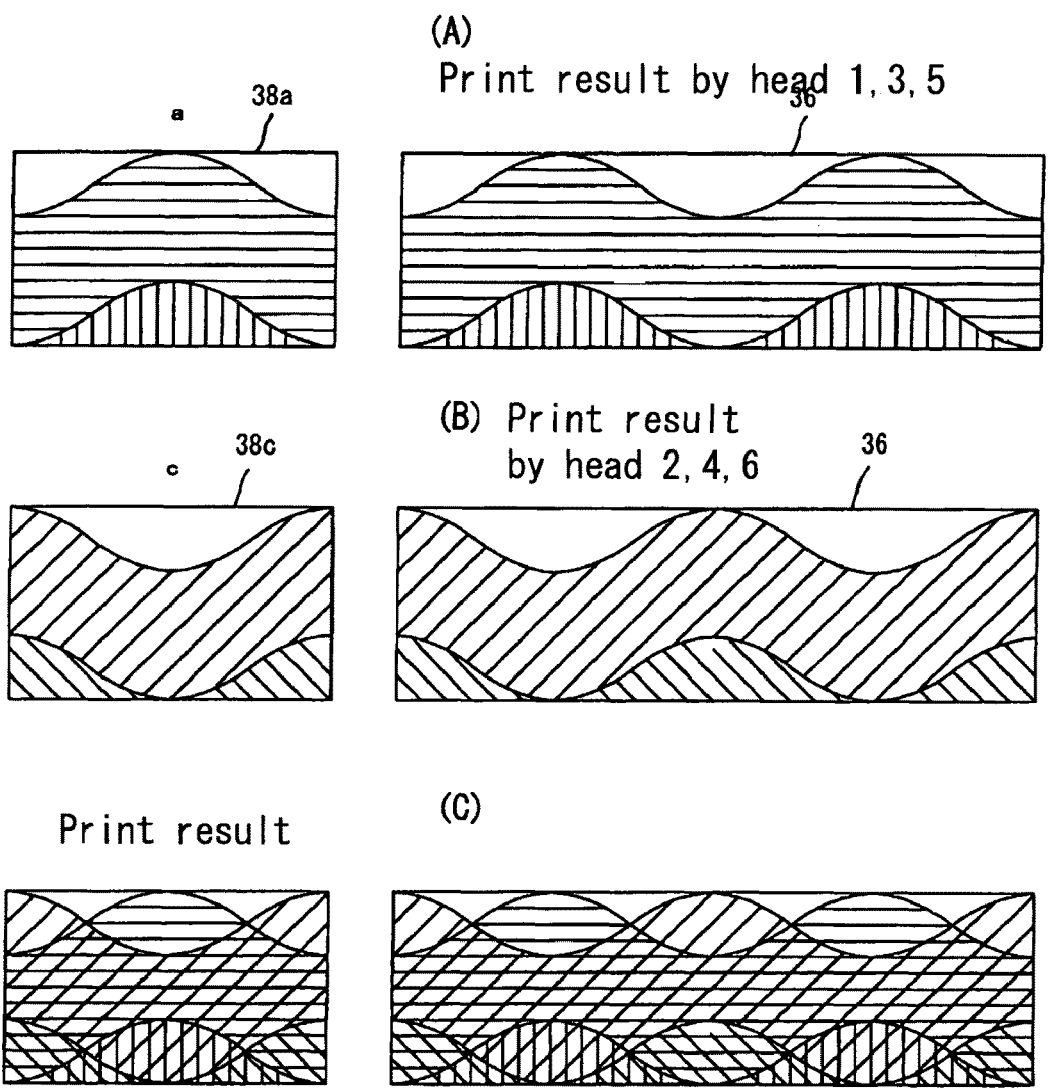
FIG. 30 is an explanatory diagram showing other embodiment of the present invention.

FIG. 30 shows the printing results of deformed data portion 36 created by mask pattern data 38*a* of basic type, and deformed data portion 36 created by mask pattern data 38*c* of developed type from portion (c). The print data having deformed data portion 36 created by mask pattern data 38*a* of basic type is supplied to No. 1, 3, and 5 printing heads 30, and the print data having deformed data portion 36 created by mask pattern data 38*c* of developed type from portion (c) is supplied to No. 2, 4, and 6 printing heads 30.

The deformed data portion 36 of the print data having deformed data portion 36 created by mask pattern data 38*a* of basic type is printed by No. 1, 3, and 5 printing heads 30 as shown in FIG. 30 (A). The deformed data portion 36 of the print data having deformed data portion 36 created by mask pattern data 38*c* of developed type from portion (c) is printed No. 2, 4, and 6 printing heads 30 as shown in FIG. 30 (B). The left side of FIG. 30 (C) shows the overlapped portion of mask pattern data 38*a* and 38*c*, and the right side of FIG. 30 (C) shows the complicated overlapped printing result of printing of deformed data portions of the print data by the No. 1, 2, 3, 4, 5, and 6 printing heads 30. The present invention is not particularly limited to the above configuration in which the deformed data portions 36 of the same phase are supplied to No. 1, 3, and 5 printing heads 30, and the deformed data portions 36 of the same phase are supplied to No. 2, 4, and 6 printing heads 30, but the print data having deformed data portions created by mask pattern data different in phase may be supplied in individual printing heads.

The dot information deleted and decimated from the deformed data portion created by the mask pattern data created in every printing head 30 is complemented by the complementary data of the mask pattern used in every printing head.

In the preferred embodiment, by forming the deformed data portion changed in printing rate at the joint of the print data, the printing regularity at the joint of print data is eliminated, and randomness is generated, and by the synergistic effect with the streak generation preventive effect of the concave and convex shapes of the deformed data portion, generation of streaks at the joint is prevented. Another effect is suppression of continuation of printing in lateral direction from a nozzle of poor printing precision positioned at the end when nozzles for discharging the ink are arrayed in parallel.

In the preferred embodiment, the printing medium is conveyed at equal pitches of 50 nozzles each as mentioned above, but the pitches may be changed in every conveying operation. It is intended to print dots between nozzle pitches when printing at small nozzle pitches, and equal pitches are 50 nozzles, but the pitches may be changed in every conveying operation by feeding 49 nozzles or by feeding 51 nozzles. In the relation between the conveying of printing medium (paper) and scanning of printing head, printing and paper feed may be done by a going stroke of the printing head, and printing and paper feed may be done by a returning stroke of the printing head, but a same line may be printed by going stroke and returning stroke of the head, and hence the head scanning and paper feed are not particularly specified in the preferred embodiment.

The controller 4 judges whether printing of data is complete at step 9 in FIG. 2 or not, and stops the printing if judged affirmatively.

As described herein, the printing apparatus and the printing method of the present invention are particularly useful when printing images at high quality by using a printer, and the present invention is particularly suited to the ink jet printer of the type in which the head unit moves in the lateral direction.

What is claimed is:

1. A printing apparatus for supplying print data composed of a multiplicity of dot information, comprising:
    a printing head having a plurality of dot forming elements arrayed along a sub-scanning direction, the printing head being configured to move relative to a printing medium in a main scanning direction and the sub-scanning direction, and print an image on the surface of the printing medium,
    wherein the printing head is configured to form a deformed data portion so that dots may not be arrayed continuously in the main scanning direction of the printing head in end portions of the sub-scanning direction of the print data supplied in every main scanning operation of the printing head.

2. The printing apparatus according to claim 1,
    wherein the printing head is configured to form a dot array in the deformed data portion in a shape of a waveform.

3. The printing apparatus according to claim 1,
    wherein the printing apparatus is configured to complete the printing of the image sequentially in a unit of N times (N being an integer) of scanning of the printing head on the printing medium, and supply the print data of the image having the deformed data portion to the printing head.

4. The printing apparatus according to claim 1,
    wherein the printing head is configured to form the deformed data portion at the rear end portion of the sub-scanning direction of the print data including the ends of image among the print data supplied in every scanning on the printing head, form the deformed data portion at the front end portion and rear end portion of the sub-scanning direction of the print data of the intermediate portion of the image, and form the deformed data portion at the front end portion of the sub-scanning direction of the print data including the rear end of the image.

5. The printing apparatus according to claim 1,
wherein when printing of the image including the deformed data portion is completed, the printing apparatus is configured to compliment a deletion portion of the image of the deformed data portion by the deformed data portion of the print data supplied to the printing head in next scanning of the printing head.

6. A printing method for printing on a printing medium, comprising:
moving a printing head sequentially in a main scanning direction; and
delivering the printing medium in a sub-scanning direction in a print unit of print data of n (n being an integer) lines,
wherein end portion lines at a joint side repeat concave and convex shapes so that a specified number of lines at the joint side of the print data may not be arrayed continuously in the main scanning direction.

7. The printing method according to claim 6,
wherein the concave and convex shapes of the joint side of the print data, and the concave and convex shapes of the joint side of next print data adjacent to the print data are printed in a mutually fitted state.

8. The printing method according to claim 6,
wherein the concave and convex shapes are waveforms.

9. The printing method according to claim 7,
wherein the concave and convex shapes are formed by deleting the dot information at the joint side of print data by a mask pattern, and the deleted dot information is complemented by the concave and convex shapes of the print data printed by next scanning.

10. The printing method according to claim 9,
wherein the complement data of the deleted dot information may be created by inverting the mask pattern.

11. A printing apparatus for supplying print data composed of a multiplicity of dot information, comprising:
a printing head having a plurality of dot forming elements arrayed along a sub-scanning direction, the printing head being configured to move relative to a printing medium in a main scanning direction and a sub-scanning direction, and print an image on the surface of the printing medium,
wherein the printing head is configured to form a deformed data portion having concave and convex parts so that dots may not be arrayed continuously in the main scanning direction of the printing head in end portions, and at an end side of the sub-scanning direction of a main data portion of the print data supplied in every main scanning operation of the printing head, and the printing rate of the deformed data portion is capable of being changed.

12. The printing apparatus according to claim 11,
wherein the printing apparatus is configured to change the printing rate of the deformed data portion in the sub-scanning direction.

13. The printing apparatus according to claim 11,
wherein the printing apparatus is configured to change the printing rate of the deformed data portion in the main scanning direction.

14. The printing apparatus according to claim 11,
wherein the printing apparatus is configured to change the printing rate of the deformed data portion along both the main scanning direction and the sub-scanning direction.

15. The printing apparatus according to claim 11,
wherein the printing head is configured to form a dot sequence of the concave and convex parts of the deformed data portion so as to have a shape of waveform.

16. The printing apparatus according to claim 11,
wherein the printing apparatus is configured to provide a region of 100% printing rate at a side of the deformed data portion contacting with the main data portion, and enable the region of 100% printing rate and a region changed in the printing rate of the deformed data portion to contact with each other in a concave and convex profile.

17. The printing apparatus according to claim 11,
wherein the concave and convex profile is a waveform.

18. The printing apparatus of claim 11,
wherein the printing apparatus is configured to create complementary data for complementing dot data deleted and decimate the complementary data from the deformed data portion, and compliment the deleted dot data of the deformed data portion by the complementary data.

19. The printing apparatus according to claim 18,
wherein the printing head is configured to complete printing of the image sequentially in a unit of N times (N being an integer) of scanning of the printing head on the printing medium, and change the print data of the image having the deformed data portion in the printing rate, and supply the print data having the complementary data and/or the print data having both the deformed data portion and complementary data to the printing head.

20. The printing apparatus according to claim 19,
wherein the printing head is configured to form the deformed data portion at the rear end of sub-scanning direction of print data including the leading end of an image, in the print data supplied to the printing head in every scanning, form the deformed data portion at the rear end of sub-scanning direction of print data in intermediate portion of an image, and complementary data for complementing the deformed data portion of the adjacent print data is capable of being created at the front end, and complementary data for complementing the deformed data portion of the adjacent print data is capable of being created at the front end of sub-scanning direction of print data including the rear end of the image.

21. The printing apparatus according to claim 18,
wherein when printing of the image including the deformed data portion is completed, the printing apparatus is configured to compliment a deletion portion of the image of the deformed data portion by the complementary data added to the end portion of the print data supplied to the printing head in next scanning of the printing head.

22. A printing method for printing on a printing medium, comprising:
moving a printing head sequentially in a main scanning direction and delivering the printing medium in a sub-scanning direction in a print unit of print data of n (n being an integer) lines,
wherein the printing rate in a specified range near a joint side is changed in the main scanning direction so that a specified number of lines at the joint side of the print data may not be arrayed continuously in the main scanning direction, and that the joint side end portion lines may repeat concave and convex shapes.

23. The printing method according to claim 22,
wherein the printing rate at the joint side of the print data is changed in sub-scanning direction.

24. The printing method according to claim 22,
wherein the printing rate at the joint side of the print data is changed in main scanning direction.

25. The printing method according to claim 22,
wherein the printing rate at the joint side of the print data is changed along both the main scanning direction and the sub-scanning direction.

26. The printing method according to claim 22, wherein a region changed in the printing rate at the joint side of the print data is formed as a deformed data portion, complementary data is created for complementing the dot data deleted and decimated from the deformed data portion, and the complementary data is overlapped and printed on the deformed data portion.

27. The printing method according to claim 26,
wherein complementary data for complementing the dot data deleted and decimated from the deformed data portion is provided at the joint side of other print data contacting with the joint of the print data having the deformed data portion, and the complementary data is overlapped and printed on the deformed data portion.

28. The printing method according to claim 22, wherein the concave and convex shapes of the deformed data portion are formed in a waveform.

29. A printing apparatus for moving a printing head and a printing medium relatively in a main scanning direction and a sub-scanning direction, supplying print data composed of a multiplicity of dot information, comprising:
a plurality of the printing heads arrayed in parallel so as to overlap in the main scanning direction, having a plurality of dot forming elements arrayed along a sub-scanning direction, and being configured to print an image on the surface of the printing medium; and
a deformed data generating means for generating a deformed data portion in the print data by forming concave and convex parts so that end portion dots of the print data may not be arrayed continuously in the main scanning direction of the printing heads in the end portion data of sub-scanning direction of the print data supplied to each printing head, and for generating the deformed data portions deviated in phase, and print data having deformed data portion deviated in phase are capable of being supplied to the plurality of printing heads, and the deformed data portions deviated in phase by the plurality of printing heads are capable of being overlapped and printed.

30. A printing apparatus for moving a printing head and a printing medium relatively in a main scanning direction and a sub-scanning direction, supplying print data composed of a multiplicity of dot information, comprising:
the printing heads having a plurality of dot forming elements arrayed along a sub-scanning direction, and configured to print an image on the surface of the printing medium;
a plurality of printing heads arrayed in parallel so as to overlap in the main scanning direction;
a deformed data generating means for generating a deformed data portion having concave and convex parts so that dots may not be arrayed continuously in the main scanning direction of the printing heads in the end portion data of sub-scanning direction of the print data supplied to the printing heads; and
a means for supplying print data having deformed data portions deviated in phase of concave and convex parts to the plurality of printing heads, and overlapping and printing the deformed data portions deviated in phase of concave and convex parts by the plurality of printing heads.

31. The printing apparatus of claim 29,
wherein the deformed data generation means is for generating a dot sequence of concave and convex parts of the deformed data portion in a waveform.

32. The printing apparatus according to claim 29,
wherein the deformed data generation means is for providing a region changed in printing rate having the concave and convex parts in the deformed data portion, and the printing apparatus is configured to provide a region of 100% printing rate in the print data contacting with a main data portion, and enable the region of 100% printing rate and a region changed in the printing rate of the deformed data portion to contact with each other in a concave and convex profile.

33. The printing apparatus according to claim 32,
wherein the concave and convex profile is a waveform.

34. The printing apparatus according to claim 29,
wherein the printing apparatus is configured to create complementary data for complementing deleted dot data of the deformed data portion, and compliment the deleted dot data of the deformed data portion by the complementary data.

35. The printing apparatus according to claim 34,
wherein the printing apparatus is configured to print the image sequentially and completely in a unit of scanning of N times (N being an integer) on the printing medium by the printing head, and provide the printing head with print data of the image having the deformed data portion, and the print data having the complementary data and/or the print data having both the deformed data portion and the complementary data.

36. The printing apparatus according to claim 35,
wherein the deformed generating means is for generating the deformed data portion at the rear end portion of the sub-scanning direction of the print data including the ends of image among the print data supplied in every scanning on the printing head, generating the deformed data portion at the rear end portion of the sub-scanning direction of the print data including the leading end of the image, and generating the deformed data portion in the rear end portion of the sub-scanning direction of the print data in the intermediate portion of the image, and complementary data for complementing the deformed data portion of the adjacent print data is capable of being formed at the front end portion, and complementary data for complementing the deformed data portion of the joining print data is capable of being formed at the front end portion of the sub-scanning direction of the print data including the rear end of the image.

37. The printing apparatus according to claim 36,
wherein when printing of the image including the deformed data portion is completed, the printing apparatus is configured to compliment a deletion portion of the image of the deformed data portion by the complementary data added to the end portion of the print data supplied to the printing head in next scanning of the printing head.

38. A printing method for printing on a printing medium, comprising:
supplying n lines of (n being an integer) print data as a print unit sequentially to a plurality of printing heads arrayed in parallel so as to overlap in a main scanning direction; and moving the printing heads in the main scanning direction and delivering the printing medium in a sub-scanning direction, wherein a deformed data portion is created in the print data by forming concave and convex parts so that end portion dots of the print data may not be arrayed continuously in the main scanning direction of the printing heads to end portion data of sub-scanning direction of the print data supplied to each printing head, and the deformed data portions deviated in phase by the plurality of printing heads overlapped and printed to the plurality of printing heads by supplying the print data having deformed data portions deviated in phase.

39. A printing method for printing on a printing medium, comprising:

supplying n lines of (n being an integer) print data as a print unit sequentially to a plurality of printing heads arrayed in parallel so as to overlap in a main scanning direction; and moving the printing heads in the main scanning direction and delivering the printing medium in a sub-scanning direction, in which a plurality of mask pattern data are created by deviating the phase of a basic mask pattern, a deformed data portion is formed by forming concave and convex parts so that dots may not be arrayed continuously in the main scanning direction in the end portion of the sub-scanning direction of a main data portion of the print data supplied to each printing head by the mask pattern data, the deformed data portions deviated in phase are supplied to the plurality of the printing heads, and the deformed data portions deviated in phase by the plurality of printing heads are overlapped and printed.

40. The printing method according to claim 38, wherein complementary data for complementing deleted dot data of the deformed data portion is created, and the complementary data is overlapped and printed in the deformed data portion.

41. The printing method according to claim 40, wherein complementary data for complementing the deleted dot data of the deformed data portion is provided at a joint side of other print data joining to the joint of the print data having the deformed data portion, and complementary data is overlapped and printed to the deformed data portion.

42. The printing method according to claim 38, wherein the concave and convex parts of the deformed data portion are shaped in a waveform.

43. The printing apparatus of claim 30, wherein the deformed data generation means is for generating the dot sequence of concave and convex parts of the deformed data portion in a waveform.

44. The printing apparatus according to claim 30, wherein the deformed data generation means is for providing a region changed in printing rate having the concave and convex parts in the deformed data portion, and the printing apparatus is configured to provide a region of 100% printing rate is provided in the print data contacting with a main data portion, and enable the region of 100% printing rate and a region in the printing rate of the deformed data portion to contact with each other in a concave and convex profile.

45. The printing apparatus according to claim 30, wherein complementary data is created for complementing deleted dot data of the deformed data portion, and the deleted dot data of the deformed data portion is complemented by the complementary data.

46. The printing method according to claim 39, wherein complementary data for complementing deleted dot data of the deformed data portion is created, and the complementary data is overlapped and printed in the deformed data portion.

47. The printing method according to claim 39, wherein the concave and convex parts of the deformed data portion are shaped in a waveform.

* * * * *